(12) United States Patent
Hong et al.

(10) Patent No.: US 10,504,492 B2
(45) Date of Patent: Dec. 10, 2019

(54) APPARATUS AND METHODS FOR GENERATING DYNAMIC TRACE DATA ON A GPU

(71) Applicant: Intel Corporation, Santa Clara, CA (US)

(72) Inventors: Sunpyo Hong, Framingham, MA (US); Konstantin Levit-Gurevich, Kiryat Byalik (IL); Michael Berezalsky, Tirat Carmel (IL); Arik Narkis, Kiryat Tivon (IL); Noam Itzhaki, Yokneam Elit (IL)

(73) Assignee: Intel Corporation, Santa Clara, CA (US)

( * ) Notice: Subject to any disclaimer, the term of this patent is extended or adjusted under 35 U.S.C. 154(b) by 8 days.

(21) Appl. No.: 15/971,988

(22) Filed: May 4, 2018

(65) Prior Publication Data

US 2019/0043457 A1 Feb. 7, 2019

(51) Int. Cl.
*G09G 5/39* (2006.01)
*G06F 11/34* (2006.01)
(Continued)

(52) U.S. Cl.
CPC .......... *G09G 5/39* (2013.01); *G06F 9/00* (2013.01); *G06F 11/3024* (2013.01);
(Continued)

(58) Field of Classification Search
CPC ......... G06T 15/005; G06T 1/20; G06T 15/04; G09G 5/363; G06F 3/14; H03M 13/4169
See application file for complete search history.

(56) References Cited

U.S. PATENT DOCUMENTS

| 6,189,141 | B1 | 2/2001 | Benitez et al. |
| 6,351,844 | B1* | 2/2002 | Bala ..................... G06F 9/3808 712/209 |
| 2013/0283020 | A1* | 10/2013 | Ehrlich ............... G06F 9/30072 712/226 |

OTHER PUBLICATIONS

"GitHub-NVlags/SASSI: Flexible GPGPU instrumentation", retrieved on Aug. 9, 2018, 3 pages, https://github.com/NVlabs/SASSI.
(Continued)

*Primary Examiner* — Todd Buttram
(74) *Attorney, Agent, or Firm* — Schwabe, Williamson & Wyatt, P.C.

(57) ABSTRACT

An apparatus for generating dynamic trace data of binary code running on one or more execution units of a Graphics Processing Unit (GPU) though binary instrumentation is presented. In embodiments, the apparatus may include an input interface disposed in the GPU to receive instrumented binary code and communication data, and an output interface disposed in the GPU, and coupled to a memory of a computer hosting the GPU. In embodiments, the memory may be further coupled to the input interface and a Central Processing Unit (CPU) of the computer, the memory having a trace buffer and a control buffer, the control buffer including an overflow flag of the trace buffer. In embodiments, the apparatus may further include an execution unit (EU) disposed in the GPU and coupled to the input interface and to the output interface, to conditionally execute the instrumented binary code and generate dynamic trace data when the overflow flag is not set to indicate an overflow condition. In embodiments, if it is set, the overflow flag may be cleared by the CPU.

25 Claims, 14 Drawing Sheets

(51) Int. Cl.
*G06F 11/30* (2006.01)
*G09G 5/00* (2006.01)
*G06F 9/00* (2006.01)

(52) U.S. Cl.
CPC ...... *G06F 11/3466* (2013.01); *G06F 11/3476* (2013.01); *G09G 5/006* (2013.01)

(56) References Cited

OTHER PUBLICATIONS

Mark Stephenson et al., "Flexible Software Profiling of GPU Architectures", Jun. 13-17, 2015, 13 pages, ISCA 15, Portland, OR, https://www.cs.utexas.edu/users/skeckler/pubs/ISCA_2015_SASSI.pdf.

Gregory Diamos et al., "The Design and Implementation Ocelot's Dynamic Binary Translator from PTX to Multi-Core x86", retrieved on Aug. 9, 2018, 16 pages, School of Engineering and Computer Engineering, Georgia Institute of Technology, Atlanta, Georgia, http://www.cercs.gatech.edu/tech-reports/tr2009/git-cercs-09-18.pdf.

Gregory Diamos et al., "Ocelot: A Dynamic Optimization Framework for Bulk-Synchronous Applications in Heterogeneous Systems", Sep. 11-15, 2010, 12 pages, Vienna, Austria, PACT'10, http://gpuocelot.gatech.edu/wp-content/uploads/pact2010-ocelot.pdf.

Extended European Search Report dated Aug. 1, 2019 for European Patent Application No. 19166920.9, 9 pages.

Christopher Erb et al., "Dynamic Buffer Overflow Detection for GPGPUs", Feb. 4, 2017, 13 pages, Code and Optimization, IEEE Press, Piscataway, NJ.

\* cited by examiner

APPARATUS AND METHODS FOR GENERATING DYNAMIC TRACE DATA ON A GPU

FIELD

The present invention relates to computer systems, and more specifically to methods and apparatus to generate dynamic trace data on a graphics processing unit (GPU).

BACKGROUND

The mode of execution on a GPU (Graphics Processing Interface) is different from that on a Central Processing Unit (CPU). The GPU may be understood to act as the "slave" that fulfills requests from the CPU, which may be understood to act as the "master." One consequence of the GPU as "slave" is its lack of any operating system, as well as a lack of services available on the GPU to instrument code.

DETAILED DESCRIPTION

Figure 1:
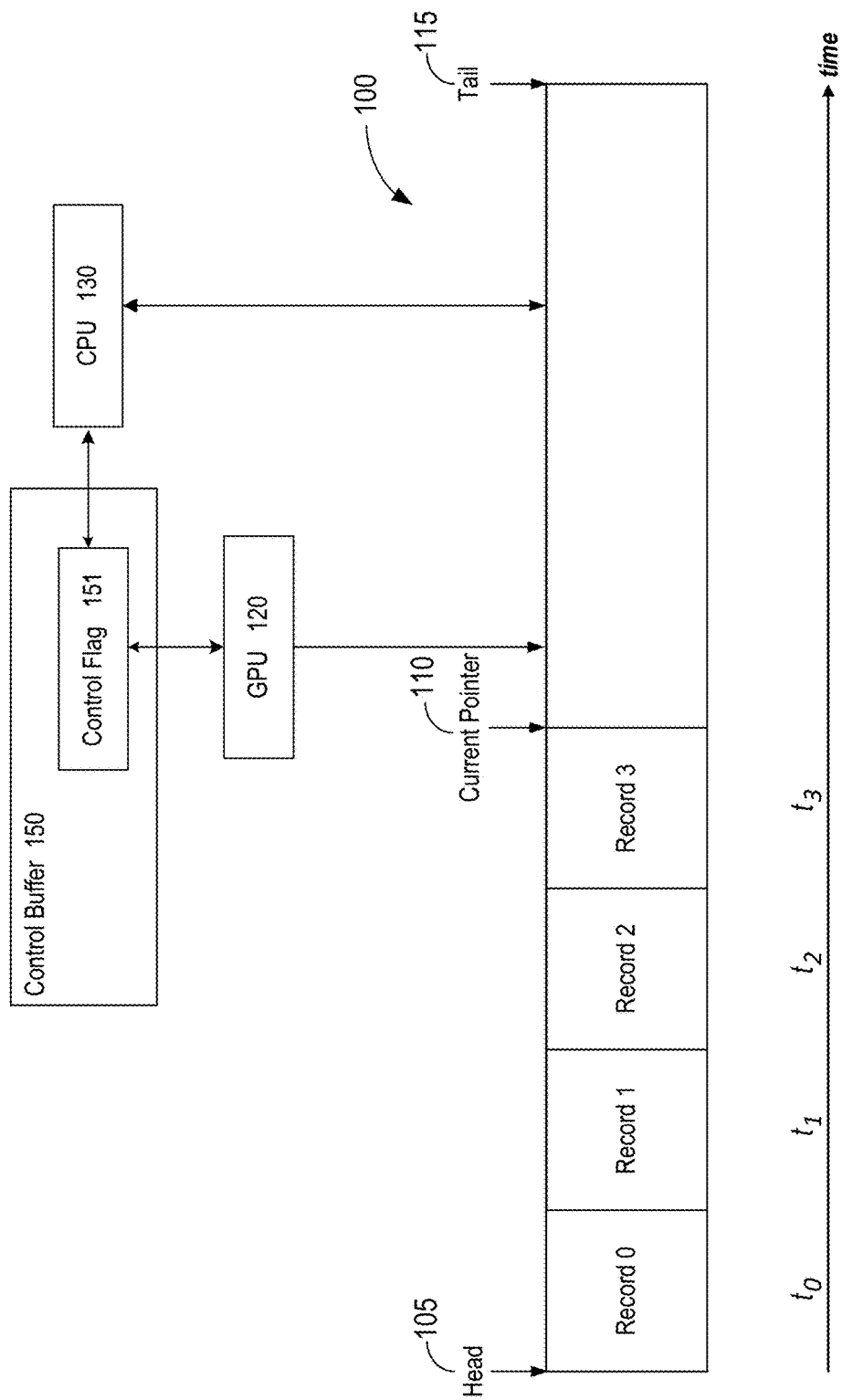
FIG. 1 illustrates an example trace buffer of an example computer memory, in accordance with various embodiments.

In embodiments, an apparatus for generating dynamic trace data of binary code running on one or more execution units of a Graphics Processing Unit (GPU) though binary instrumentation may include an input interface disposed in the GPU to receive instrumented binary code and communication data, and an output interface disposed in the GPU, and coupled to a memory of a computer hosting the GPU. In embodiments, the memory may be further coupled to the input interface and a Central Processing Unit (CPU) of the computer, the memory having a trace buffer and a control buffer, the control buffer including an overflow flag of the trace buffer. In embodiments, the apparatus may further include an execution unit (EU) disposed in the GPU and coupled to the input interface and to the output interface, to conditionally execute the instrumented binary code and generate dynamic trace data when the overflow flag is not set to indicate an overflow condition. In embodiments, if it is set, the overflow flag may be cleared by the CPU.

In embodiments, an apparatus for computing, including management of dynamic trace data, may include a memory having a trace buffer to receive dynamic trace data conditionally generated by execution of instrumented binary code on a Graphics Processing Unit (GPU) of the apparatus. In embodiments, the memory may further include a control buffer having an overflow flag of the trace buffer. In embodiments, the GPU may execute the instrumented binary code and may cause the dynamic trace data to be generated when the overflow flag does not indicate an overflow condition. In embodiments, the apparatus may further include a CPU coupled to the memory to control the overflow indication of the overflow flag to regulate the execution of the instrumented binary code and generation of the dynamic trace data by the GPU.

In embodiments, one or more non-transitory computer-readable storage media may include a set of instructions, which, when executed on a processor, cause the processor to instrument binary code for execution on a Graphics Processing Unit (GPU), including to, for example, divide the binary code into basic blocks (BBs) and insert profiling code at the beginning of each BB to write a dynamic instruction trace, including a BB identifier, to a trace buffer provided in a memory of a host computer of the GPU, the memory coupled to the GPU. Or, for example, to identify memory instructions in the binary code and insert an instrumentation routine into each instruction to write a dynamic memory trace, including a memory type and a dynamic memory address, to the trace buffer. In embodiments, the trace buffer may have an associated overflow flag, and the profiling code may write the dynamic instruction trace when the overflow flag is not set to indicate an overflow condition. In embodiments, the overflow flag, when set to indicate an overflow condition, may be reset by the CPU of the computer.

In embodiments, a method performed by a CPU of a computer of post-processing dynamic trace data generated by a GPU of the computer from executing instrumented binary code may include reading from a trace buffer, the trace buffer provided in a memory of the computer and coupled to both the GPU and the CPU, dynamic trace data. In embodiments, the dynamic trace data may include a set of sequential records written by the GPU to the trace buffer in response to executing the instrumented binary code, the set including instruction traces, or both instruction and memory traces. In embodiments, the instruction traces may each include a basic block identifier (BB_ID) of a basic block (BB) of original binary code of the instrumented binary code. In embodiments, the method may further include analyzing the respective BB_IDs of the instruction traces to determine whether one or more intermediate BBs of the binary code were executed by the GPU but not instrumented due to being control flow-changing BBs, and identifying the one or more intermediate BBs; and outputting a program execution sequence for the original binary code.

In embodiments, identifying the one or more intermediate BBs may further include identifying a starting BB and an ending BB of the dynamic trace data, recursively identifying, by referring to a control flow graph for the binary code, each child BB of the starting BB and each child BB of any identified child BB between the starting BB and the ending BB, deleting any child BB that has no possible flow path to the ending BB, continuing until the ending BB is reached; and outputting a path from the starting BB to the ending BB.

Alternatively, in embodiments, identifying the one or more intermediate BBs may further include identifying a BB that is repeated in adjacent instruction traces in the dynamic trace data, iterating over every child BB of the repeated BB to find a control-flow changing child BB, and determine if the control-flow changing child has a negative index. In embodiments, the method may further include inserting the child BB with a negative index after the repeated BB in the path to the ending BB, and outputting a path from the starting BB to the ending BB.

In the description to follow, reference is made to the accompanying drawings which form a part hereof wherein like numerals (or, as the case may be, the last two digits of an index numeral) designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Also, it is noted that embodiments may be described as a process depicted as a flowchart, a flow diagram, a dataflow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function. Furthermore, a process may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used hereinafter, including the claims, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may implement, or functions associated with the circuitry may be implemented by, one or more software or firmware modules.

As used hereinafter, including the claims, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. A memory may include one or more buffers allocated by a central processing unit of a computer coupled to the memory. The term "computer-readable medium" may include, but is not limited to, memory, portable or fixed storage devices, optical storage devices, wireless channels, and various other mediums capable of storing, containing or carrying instruction(s) and/or data.

As used hereinafter, including the claims, the term "computing platform" may be considered synonymous to, and may hereafter be occasionally referred to, as a computer device, computing device, client device or client, mobile, mobile unit, mobile terminal, mobile station, mobile user, mobile equipment, user equipment (UE), user terminal, machine-type communication (MTC) device, machine-to-machine (M2M) device, M2M equipment (M2ME), Internet of Things (IoT) device, subscriber, user, receiver, etc., and may describe any physical hardware device capable of sequentially and automatically carrying out a sequence of arithmetic or logical operations, equipped to record/store data on a machine readable medium, and transmit and receive data from one or more other devices in a communications network. Furthermore, the term "computing platform" may include any type of electronic device, such as a cellular phone or smartphone, a tablet personal computer, a wearable computing device, an autonomous sensor, personal digital assistants (PDAs), a laptop computer, a desktop personal computer, a video game console, a digital media player, an in-vehicle infotainment (IVI) and/or an in-car entertainment (ICE) device, an in-vehicle computing system, a navigation system, an autonomous driving system, a vehicle-to-vehicle (V2V) communication system, a vehicle-to-everything (V2X) communication system, a handheld messaging device, a personal data assistant, an electronic book reader, an augmented reality device, and/or any other like electronic device.

As used hereinafter, including the claims, the term "link" or "communications link" may refer to any transmission medium, either tangible or intangible, which is used to communicate data or a data stream. Additionally, the term "link" may be synonymous with and/or equivalent to "communications channel," "data communications channel," "transmission channel," "data transmission channel," "access channel," "data access channel," "channel," "data link," "radio link," "carrier," "radiofrequency carrier," and/or any other like term denoting a pathway or medium through which data is communicated.

As noted above, an execution mode on a graphics processing interface (GPI) is different from that on a CPU. It is noted that one way of understanding the relationship between a CPU and a GPU in a computing system is that the GPU acts as a "slave", fulfilling requests from the CPU, acting as a "master." One consequence of the GPU acting as a "slave" is its lack of operating system, as well as its lack of available services to instrument code.

As a result, memory tasks need to be performed manually in the GPU, as well as across both CPU and GPU. Furthermore, memory for instrumentation of code to run on the GPU would need to be pre-allocated, as it cannot be allocated on-the-fly as is the case with a CPU running instrumented code. In general, a GPU does not include storage. Therefore, in embodiments, a dynamic trace generated on a GPU may be stored to a host computer's hard-disk, and in embodiments, this must be specifically provided for.

As described below, in embodiments, a CPU of a computing system may allocate a "trace buffer" in memory, in which dynamic trace data generated by the execution of instrumented binary code on a GPU of the computing system may be temporarily stored. The GPU may, in embodiments, write to the trace buffer, as long as it is not full. In embodiments, if it is full, the CPU (which may regularly poll an overflow indicator of the trace buffer) may post-process the contents of the trace buffer, and then flush the trace buffer. In embodiments, the overflow indicator of the trace buffer may be provided in a second buffer, called a "control buffer." In embodiments, the indicator may be, for example, a flag stored in a pre-defined location of the control buffer. The flag may be referred to herein, as well as in the claims, as an "overflow flag." In embodiments, if, when the GPU writes a record of dynamic trace data to the trace buffer that record fills the buffer, the GPU sets the overflow flag, and waits for the CPU to clear it before writing any additional trace data to the trace buffer. Thus, in embodiments, a CPU and a GPU may coordinate their respective actions to instrument binary code to be run on the GPU, and to facilitate the storage of dynamic trace data in memory that may be generated by execution of the instrumented code on the GPU.

As described in detail below, in embodiments, by each of the CPU and GPU polling the overflow flag on an ongoing basis, the GPU may determine whether it may write additional trace data to the trace buffer, and similarly, the CPU may determine whether it needs to post-process and then flush the contents of the trace buffer, and clear the overflow flag. In embodiments, the CPU may first post-process the contents of the trace buffer prior to flushing it, and may store the post-processed dynamic trace data to long term memory. Thus, both CPU and GPU may coordinate their actions in a synchronized way, including polling of the control buffer by both GPU and CPU, as well as pausing GPU execution in the event that the trace buffer is full. By this cooperative mechanism, trace generation may run for long running programs executed on the GPU by repeated filing and flushing of the trace buffer.

It is here noted that unlike a CPU, a GPU is a special purpose device. As such, some of its resources may be limited and already occupied by the traced program, such as, for example, registers, channels to main memory, etc. By design, a GPU may have tens or even hundreds of physical execution cores that may execute simultaneously and independently with needed sync in between. To address this design, in embodiments, a trace buffer may be partitioned across hundreds of hardware threads.

As noted above, in accordance with various embodiments, binary-instrumentation based trace generation may be facilitated. Thus, in embodiments, not only is trace generation time significantly faster (as the program is actually executed on the hardware) when compared, for example, to simulators, but the trace output represents the actual stream of instructions. It is further noted that this type of profiling is made possible by binary instrumentation technology, which refers to the instrumentation of binary code just before execution. Such instrumentation may include modifying and/or inserting additional profiling code. It is noted that the profiling information that may be obtained may include, for example, the latency of specific instructions or functions, dynamic instruction counters, reports of timestamp cycles between the kernels and functions, etc. However, for different performance studies and analysis, there is a need for gathering dynamic traces, e.g., the series of instructions executed, such as control-flow trace or memory accesses traces, where the trace may be used as an input to architecture and performance simulators. It is noted that in the GPU world such a task is not trivial, as code execution occurs across hundreds of execution units (EUs) simultaneously and independently.

Therefore, in embodiments, binary-instrumentation-based trace-generation on a GPU architecture may be enabled, without source code or other intrusive modifications by a user. Furthermore, because, in embodiments, binary interception and modification may be performed just prior to machine execution, example systems and methods may be agnostic as to language and runtimes used for an example GPU, such as, for example, OpenCL, DX, Cilk, etc. It is also noted that binary based instrumentation, may provide better writing flow, unlike, for example, source-modification or compiler based instrumentation, which generally require source or some form of intermediate representation.

The following description of apparatuses, methods and computer readable media according to various embodiments may be divided into three parts. Thus, in what follows, first described is a method of communication between GPU and CPU to prevent buffer overflow. Next described are methodologies for generating a dynamic trace. Third and finally, techniques for handling corner cases are presented.

It is noted that as used herein, including in the claims, a "dynamic trace" is a sequence of records of the same format subsequently generated in time. In embodiments, each record may include information that describes some event at a specific time and that can be consumed later. In embodiments, each record may include some profiling information about the binary code execution. Various embodiments, it is noted, are agnostic to the type of information generated, or to the specific format of a dynamic trace record). A record may include, for example, the IP address of a specific basic block (BB) of the binary code, or a memory address to be read/written from/to memory and their values. Or, for example, the record may include time stamps, access sizes, thread ID, and/or any other information a user may desire to obtain from the profiling of the binary code. As noted above, in embodiments, generated records may be saved in the trace buffer during execution. The trace buffer, however, may be limited in size, and thus, may have a Head (or base) and a Tail (=Head+size). In embodiments, the trace buffer may be accessible (mapped) from both the GPU and CPU.

FIG. 1 illustrates an example trace buffer 100 of an example computer memory, in accordance with various embodiments. As noted above, in embodiments, trace buffer 100 may be communicatively connected to both CPU 130 and GPU 120 of a host computer. With reference thereto, trace buffer 100 has a beginning location in the memory, Head 105, and ending location in the memory, Tail 115, and may include several records, such as Records 0 through 3, respectively written to the trace buffer by GPU 120 during time intervals t0, t1, t2 and t3. In embodiments, a current pointer 110 may point to the next available memory location of trace buffer 100. Thus, in embodiments, the instrumented code running on GPU 120 may save records generated by the instrumented binary code within the trace buffer at the location then pointed to by current pointer 110. Current pointer 110 may be initialized at location of Head 105, and after a new record is saved, current pointer 110 may be updated (incremented by the size of the record) to point to the next location within the trace buffer.

It is noted that real-world application profiling traces usually include large amounts of data, and thus, no matter how large a trace buffer may be, generally, it may be overflown very quickly. However, because code running on EUs of GPU 120 does not have an underlying operating system (OS), and thus is generally unable to use OS services, it cannot flush, for example, data collected within trace buffer 100 to a disk or other long term memory of the computer. In embodiments, to prevent trace buffer 100 from being overflown for extended time periods, in embodiments, a two buffer approach may be implemented, as shown in FIG. 1.

Thus, continuing with reference to FIG. 1, in embodiments, another buffer, control buffer 150, may be allocated within the memory of the computer by CPU 130. In embodiments, just as in the case of trace buffer 100, control buffer 150 may be accessible (mapped) from both GPU 120 and CPU 130, as described in detail below, with reference to FIG. 4. In embodiments, a "trace-buffer-overflow" flag, shown in FIG. 1 as control flag 151, may be provided at a pre-defined location within control buffer 150. The flag may be set (e.g., value=1) by GPU 120 when the trace buffer is full, and may be clean (e.g., value=0) otherwise. When it is set, trace buffer 100 and control flag 151 may be respectively flushed and cleared by CPU 130, and for this reason CPU 130 may continually poll on control flag 151 to determine its status (and thus the status of trace buffer 100), as described in detail below.

Figure 2:
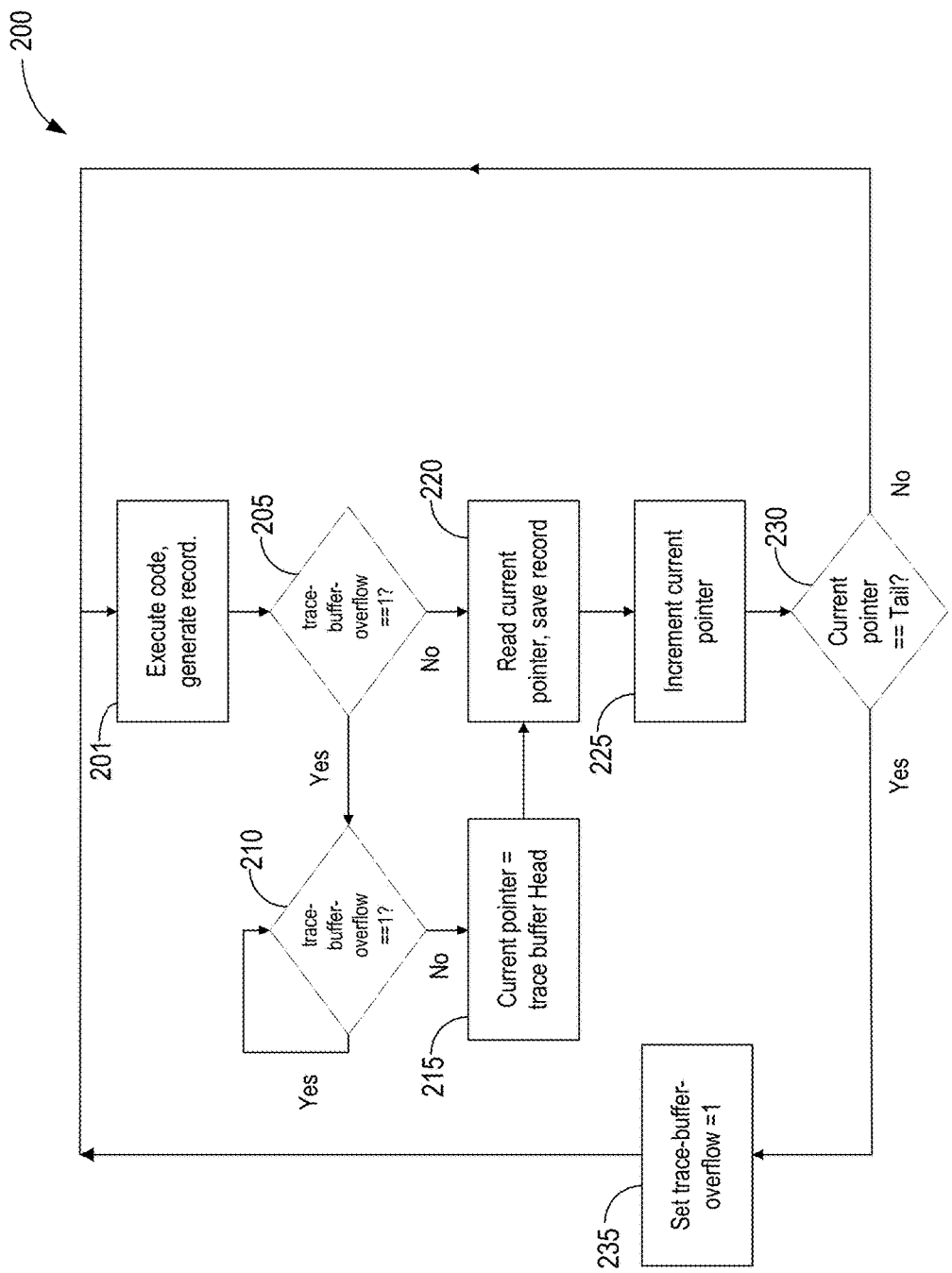
FIG. 2 illustrates an overview of the operational flow of a process to run on an example GPU, including managing the contents of a trace buffer, in accordance with various embodiments.

With reference to FIG. 2, an overview of the operational flow of a process 200 to run on an example GPU, including managing the contents of a trace buffer, in accordance with various embodiments, is presented. Thus, FIG. 2 illustrates the flow of instrumented code running on example GPU EUs. Process 200 may include blocks 201 through 230. In alternate embodiments, process 200 may have more or less operations, and some of the operations may be performed in different order.

Process 200 may begin at block 210, where an example EU of a GPU may execute instrumented binary code, and may generate an individual trace data record. From block 201, process 200 may proceed to query block 205, where it may be determined if the trace buffer overflowed, e.g., by checking whether an overflow flag for the trace buffer in a memory accessible by the GPU has been set. In embodiments, as an example, the overflow flag may have a value of 1 if set, and 0 if clear, i.e., there is no overflow. Other values may be used to indicate "overflow" or "clear", as may be desired. If at query block 205 it is determined that the overflow flag has been set, and thus the query returns Yes, indicating that the trace buffer is full and may not be written to, then process 200 may proceed to query block 210, where process 200 may loop, as shown by the Yes response, until the overflow flag is cleared by the CPU. During this period, execution on the GPU may be suspended. Once the overflow flag has been cleared, and thus query block 210 returns a No response, then process 200 may proceed to block 215, where process 200 may set the current pointer of the trace buffer equal to a Head location of the buffer. From block 215, process 200 may proceed to block 220, where it may read the value of the current pointer, and may save the record created in block 201 to the trace buffer.

Returning now to query block 205, if the response at query block 205 is No, then process 200 may proceed to block 220, where, as described above, it may read the value of the current pointer, and may save the record created in block 201 to the trace buffer. At this point both process flow paths that bifurcated at query block 205 again meet.

From block 220, process 200 may proceed to block 225, where it may, for example, increment the value of the current pointer to the next location in the trace buffer. As noted above, in embodiments, the current pointer may be incremented by the size of the record saved at block 220, and thus the current pointer may have values from Head+Record Size to Tail, as noted above. It is here noted that, in embodiments, a record need not have a fixed size, and thus the current pointer may be incremented to the next available memory location following the saving of the current record at block 220.

From block 225, process 200 may proceed to query block 230, where it may, for example, read the value of the current pointer and determine if that value is equal to Tail, which is the memory location at the end of the trace buffer. If No at query block 230, and thus the trace buffer is not full, process 200 may return to block 201, and continue executing the instrumented binary code and generate a new record. If there is no further block of code to execute (not shown) then process 200 may then terminate.

If, however, at query block 230 the response is Yes, indicating that the value of the current pointer is equal to the value of Tail, and thus the trace buffer is full, then process 200 may proceed to block 235, where the trace buffer overflow flag may be set, and process 200 may proceed to block 201, to execute another block of the instrumented binary code. If there is no further block of code to execute (not shown) then process 200 may then terminate.

Figure 3:
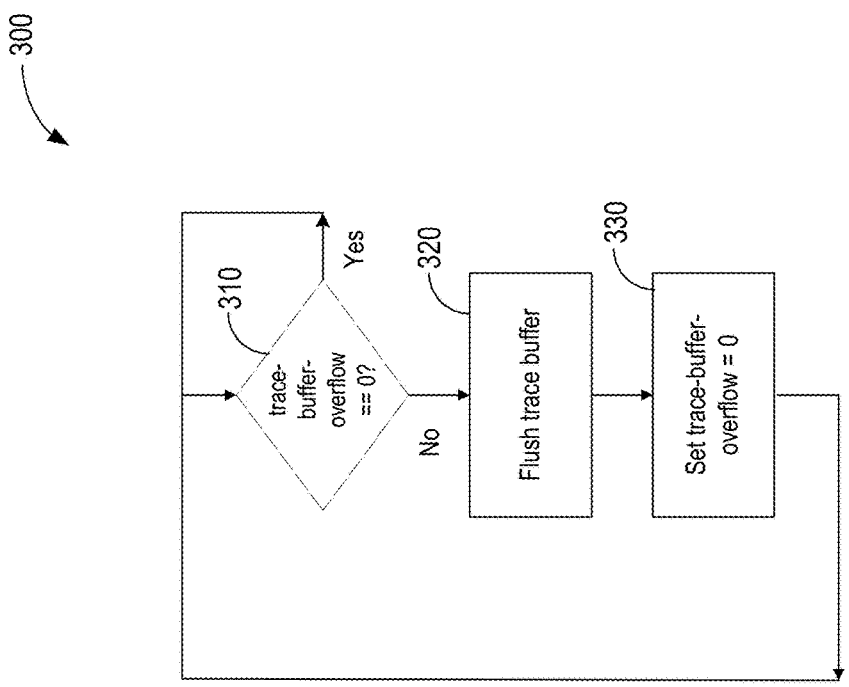
FIG. 3 illustrates an overview of the operational flow of a process to run on an example CPU, including managing the contents of a trace buffer, in accordance with various embodiments.

With reference to FIG. 3, an overview of the operational flow of a process 300 to run on an example CPU including managing the contents of a trace buffer, in accordance with various embodiments, is presented. Process 300 is a complementary process to process 200 illustrated in FIG. 2, where process the CPU on which process 300 may be run is communicatively coupled to the Process 300 may include blocks 310 through 330. In alternate embodiments, process 300 may have more or less operations, and some of the operations may be performed in different order. In embodiments, process 300 may begin at query block 310, where the CPU, or, for example, an "agent" or program running on the CPU, may poll the trace-buffer-overflow flag to determine if its value is 0, and thus not set. As long as it is not set, process 300 may loop at query block 310. However, once the response at query block 310 is No, and thus the overflow flag has been set, such as, for example, by process 200 at block 235, as described above, process 300 may proceed to block 320, where it may flush the trace buffer. As described in detail below, to flush the trace buffer may include to post-process the dynamic trace data in the trace buffer, and store the post-processed data in long term memory, such as a disk, or for example, to another buffer. It is here noted that when the CPU reads the contents of the trace buffer in post-processing, it may read it record by record. Thus, for example, it may read a first record of trace data, write the output to a file, or, for example, keep some intermediate result in memory, and move to a next record. Once it has read all of the records in the trace buffer, it may then, for example, call a routine that flushes the trace buffer. From block 320 process 300 may proceed to block 330, where it may clear the trace buffer overflow flag, for example, by setting it to 0. From block 330, process 300 may once again proceed to query block 310, where it may loop until the overflow flag is once again set.

Figure 4:
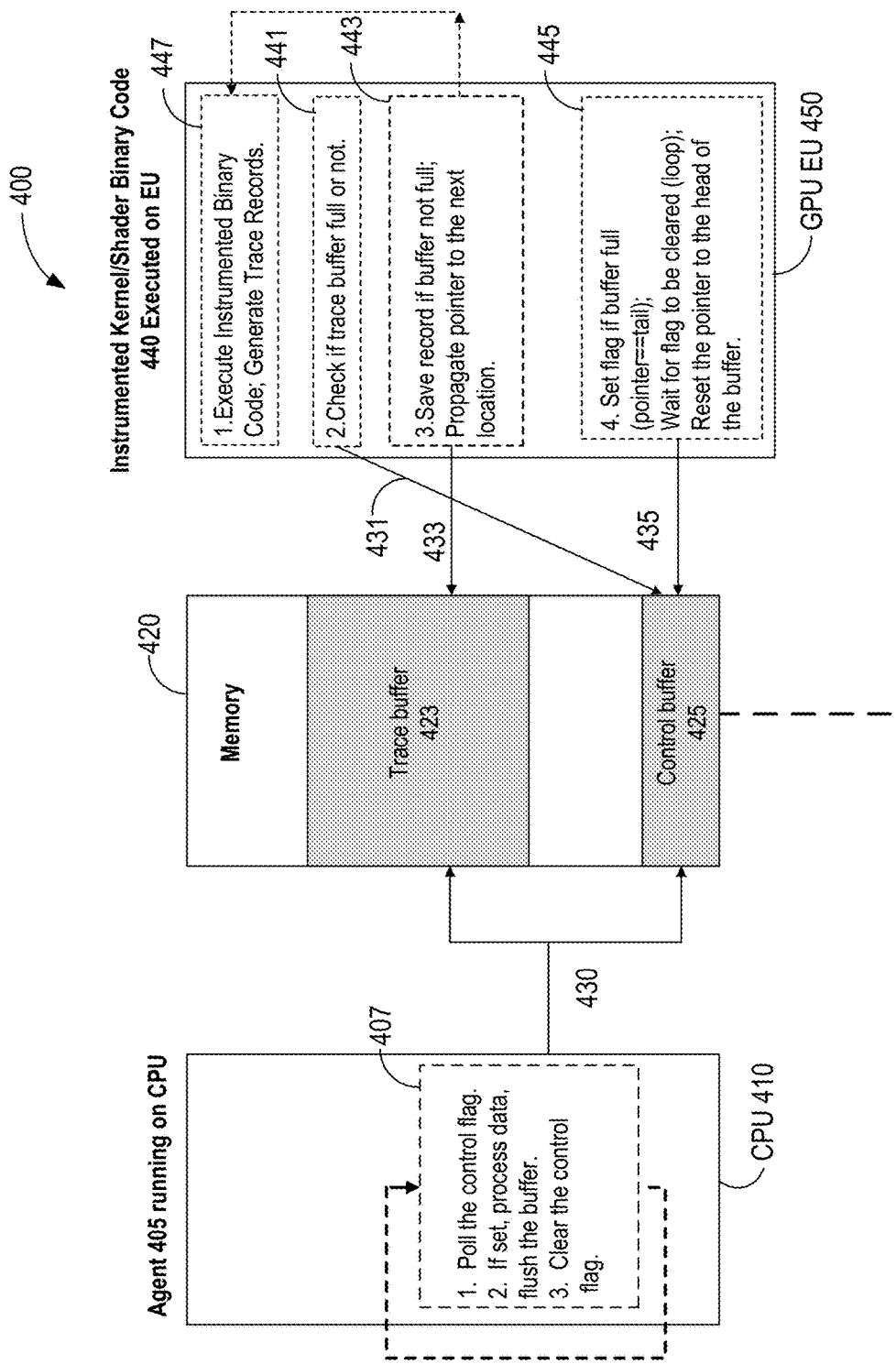
FIG. 4 illustrates an example system for trace buffer overflow control, in accordance with various embodiments.

FIG. 4, next described, schematically illustrates how a CPU, a memory, and a GPU of a computer or computing system may collectively communicate and interoperate to manage the generation and storage of trace buffer data. With reference thereto, there is shown CPU 410, Memory 420, and GPU Execution Unit (EU) 450. Each of CPU 410, and GPU EU 450, is communicably connected to memory 420, shown by communication path 430 between CPU 410 and Memory 420, and communication paths 431, 433 and 435 between GPU EU 450 and Memory 420. Memory 420 may include Trace buffer 423, and Control buffer 425. Control buffer may include, as described above, a control flag (not shown) that indicates whether the Trace buffer 423 is full or not. The control flag may be, for example, a single bit, and thus when either the GPU or the CPU need to determine the status of Trace buffer 423, they only need poll the control flag, as opposed to directly checking the status of Trace buffer 423, such as, for example, by checking whether a value of a current pointer of Trace buffer 423 is equal to its ending location, or tail.

Continuing with reference to FIG. 4, in embodiments, there may be an "agent" 405 running on CPU 410, which may perform, for example, a continually looping process to manage Trace buffer 423 in Memory 420, as shown. The example looping process may, for example, be similar to process 300, described above with reference to FIG. 3. This process may include the tasks shown in block 407, namely, poll the control flag, if set, process data and flush the buffer, and clear the control flag. As shown by the dashed line, once the control flag has been cleared, the example looping process may return to poll the control flag, such that when trace buffer 423 once again is full, it may attend to it. As noted above, by this mechanism, in embodiments, large programs may be instrumented and run on a GPU, and the generated trace data, which may fill a trace buffer multiple times, may be processed and stored.

Continuing with reference to FIG. 4, and turning now to processes occurring on the GPU, instrumented binary code 440 may be executed on a GPU EU 450, as shown in the leftmost column of FIG. 4. Process flow for various tasks performed by the execution of instrumented binary code 440 on EU 450 are shown in blocks 447 through 445, presented within GPU EU 450. These tasks are similar to, and may be understood as a high-level version of, process 200 of FIG. 2, described above.

Thus, as shown in block 447, the EU may execute the instrumented binary code and thereby generate one or more trace records. Once a trace record has been generated at block 447, the GPU, at block 441, may then check if Trace buffer 423 in memory 420 is full or not. In embodiments, as described above, this may be accomplished by checking the value of a control flag, which may be provided in Control buffer 425 of Memory 420, as shown by communications path 431 from block 441 to Control buffer 425. In embodiments, as shown at block 443, if Trace buffer 423 is not full (this may be determined by checking the control flag), then the record may be saved in the trace buffer, and a current pointer of the trace buffer may be incremented to the next location in the trace buffer. These interactions are illustrated by means of communications path 433, as shown in FIG. 4, between GPU EU 450 and Trace buffer 423.

The actions of blocks 441 and 443 may be repeated as to each newly generated trace record, until such time as the trace buffer is full, as illustrated by block 445. When that occurs, which may be determined by checking the memory location of the current pointer of trace buffer 423, i.e., by checking if pointer=tail in the trace buffer, then, block 443 is not performed, and instead, block 445 is performed. At block 445, as shown, the control flag may be set, and the process may loop, in similar manner as shown, for example, at block 210 of FIG. 2, until the control flag is cleared. Once that has occurred, the example process may reset the pointer of the trace buffer to the head of the trace buffer, as shown in block 445.

It is here noted that, in embodiments, the code shown as running on EU 450 of FIG. 4 may run independently on multiple EUs of a GPU. This is because, in general, a GPU may include a plurality of EUs. In such cases, a trace buffer and a control buffer may be allocated for each EU. Additionally, in embodiments, the trace buffer and control buffer for a given EU may be further partitioned into separate regions, each assigned to a separate thread running on the EU.

In this connection it is further noted that within any GPU, many physical execution units, or small cores, may be provided. Each EU is, in general, capable of executing code in the same manner as a CPU core. Because there are many EUs in a given GPU, many programs may execute simultaneously and independently. Moreover, each EU can execute multiple programs independently, where each program is assigned to a different thread (i.e., hardware thread). Thus, an EU is similar to a CPU core in that it may, for example, switch back and forth among the several hardware threads. Accordingly, in embodiments, each EU may have its own trace buffer and control buffer, and each of those buffers may be further partitioned, as noted, to support individual threads of the EU.

Figure 5:
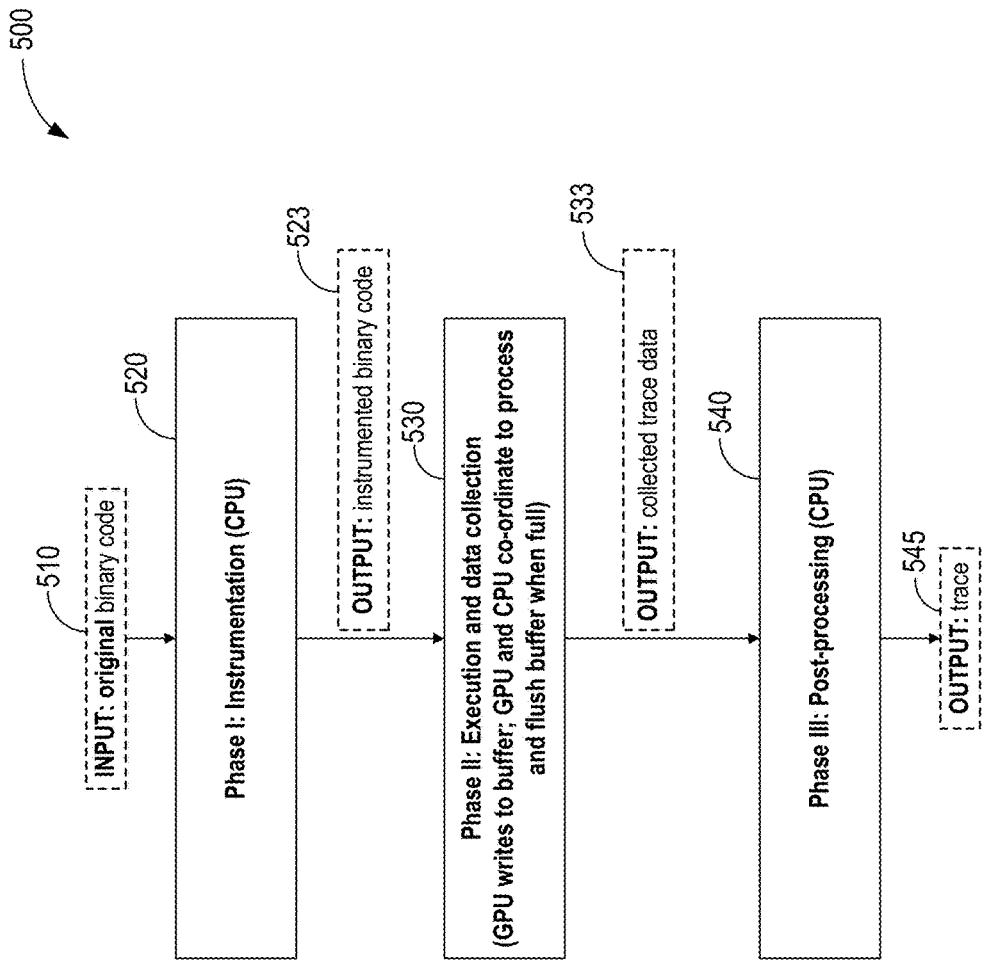
FIG. 5 illustrates an overview of the operational flow of a process for dynamic trace generation, in accordance with various embodiments.

With reference to FIG. 5, an overview of the operational flow of an overall process 500 for dynamic trace generation, storage and post-processing, involving tasks co-operatively performed by both a CPU and a GPU of a computing system, in accordance with various embodiments, is presented. With reference to FIG. 5, in general, a method of generation of dynamic traces may be understood as including three phases, an instrumentation phase, an execution phase, and a post-processing phase. In embodiments, the instrumentation and post-processing phases may be performed on the CPU, and the execution and data collection phase performed co-operatively by the CPU and the GPU of the computing system. Process 500 may include blocks 510 through 545. In alternate embodiments, process 500 may have more or less operations, and some of the operations may be performed in different order.

Process 500 may begin at block 510, where original binary code may be input to a CPU for instrumentation in a first phase, the instrumentation phase, the binary code to be run on a GPU following instrumentation. From block 510 process 500 may proceed to block 520, where the CPU may instrument the binary code to generate various traces when it is executed on the GPU. The possible types of traces may include, for example, those described in detail below with reference to FIGS. 6 and 7. As shown, the output of block 520 is instrumented binary code 523, now ready to be executed on the GPU.

From block 520, process 500 may proceed to block 530, which is a second phase, the execution phase. During this phase the instrumented code may be executed on GPU EUs, and the trace data which it generates may be collected within a trace buffer in memory, as described above, with coordination between the CPU and GPU. The GPU writes the trace data into a buffer when not full, and the CPU and GPU coordinate to set an indicator flag when it is full, and process and flush the buffer when it is full. This coordinated cycle of filling and flushing allows the trace buffer, not generally large enough to store the entire set of traces generated by execution of the instrumented binary code, to collect the data for an entire program, as described in detail above. As shown, the output of block 530 may include collected trace data 533.

From block 530, process 500 may proceed to block 540, which is a third and final phase, a post-processing phase, in which all the trace data may be combined, and a final trace produced. Further details of post-processing are described below, in connection with FIGS. 6-9. As shown, the output of block 540 may be a final trace of the instrumented code, that may, for example, be saved to disk or other system memory.

In embodiments, binary code to run on a GPU may be instrumented to generate two types of dynamic traces. One or both types may be implemented, according to various embodiments. When both types are enabled, their results may be combined in a post-processing phase by the CPU. These types, and how they may be combined, are next described.

Figure 6:
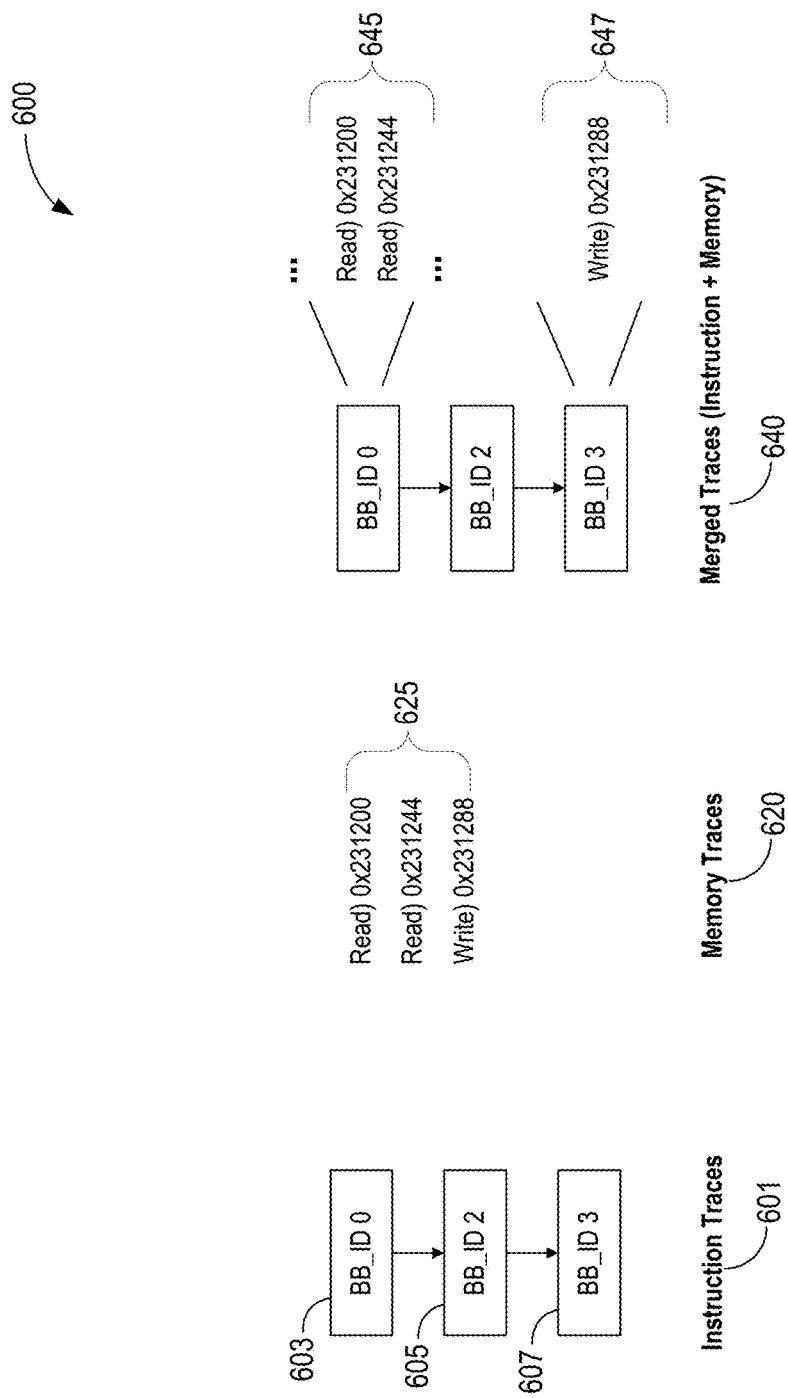
FIG. 6 illustrates several types of dynamic traces that may be generated, in accordance with various embodiments.

With reference to FIG. 6, three types of dynamic traces 600 that may be generated by instrumented binary code on a GPU, in accordance with various embodiments, are illustrated. These include instruction traces, memory traces, and third type, which is actually a combination of the two, here named, for ease of description, a "merged trace."

Continuing with reference to FIG. 6, a first, leftmost, column of the figure illustrates instruction traces 601. In embodiments, to generate an instruction trace, instrumentation of binary code, such as, for example, original binary code 510 of FIG. 5, may be implemented at a basic block level. In embodiments, profiling code may be instrumented (inserted) at the beginning of each basic block to write a basic block ID (BB_ID), i.e., an identifier of which basic block is being executed, to the trace buffer. When the instrumented binary code is executed, a series of BB_IDs, in order of their execution (i.e., a trace of the code) may be recorded in the trace buffer at hardware thread granularity. As noted above, in embodiments, a trace buffer may be evenly partitioned across all available hardware threads. It is here noted that, in general, the number of hardware threads provided in an EU is fixed, and is a function of GPU model.

In embodiments, after execution, a trace, i.e., a series of BB_IDs that were executed, ordered in time, may be retrieved. If a series of ISA instructions is also desired, in alternate embodiments, the instruction trace data may be expanded to show both BB_ID and the instructions executed in each BB_ID. In the example instruction trace of FIG. 6, a sequence of three BBs is generated, being BB_ID 0, BB_ID 2 and BB_ID 3. It is noted that BB_ID 1 did not generate any trace, and this is to illustrate those embodiments, described in detail below, where not every BB of the original binary code may be instrumented. Thus, in embodiments, as described below, an instruction trace may list several BB_IDs in sequence, but some BB_IDs may be omitted from the sequence, and thus techniques to reconstruct the missing BB_IDs may be applied.

Still continuing with reference to FIG. 6, a middle column illustrates memory traces 620. In embodiments, to instrument binary code so as to generate a memory trace for each memory access, instrumentation is done per memory instruction. In embodiments, for example, for each memory instruction, an instrumentation routine may be inserted, so that memory type, i.e., whether read or write, and dynamic memory address may be recorded in the trace buffer. As noted above, here as well recording may be done at the hardware thread level. At the end of execution, a series of memory traces including memory access type and address, may be obtained. In embodiments, such a series of memory addresses may be used as a trace itself for memory simulators. FIG. 6 illustrates three example memory traces 625. They include two read accesses, followed by a write access. It is noted that memory traces simply record each memory access, in sequence. Which BB may have performed the memory access is not recorded, which is why, in some embodiments, merged traces are used.

Thus, the rightmost column of FIG. 6 illustrates the third type of trace, merged traces 640, which is actually a combination of instruction traces 601 and memory traces 620. In embodiments, to implement merged traces, the same instrumentation described above for instruction traces and memory traces may be used, and thus both instrumentations may be inserted into the original binary code prior to execution. In this case, when the code executes, both BB_IDs and memory traces may, for example, be obtained per hardware thread and stored in the trace buffer. However, there remains a post-processing step required, which is merging of each instruction trace with any associated memory traces. The third column of FIG. 6 illustrates this post-processing step.

With reference to merged traces 640, each BB_ID that includes a memory instruction may be matched with the associated memory trace(s). For example, if BB_ID 0 has two memory reads, in embodiments, those two reads may each be matched with the first two recorded memory traces 620. It is noted that in this particular example, BB_ID 2 does not include a memory instruction, and thus the last write memory trace is matched with a write memory instruction from BB_ID 3. Thus, BB_ID 0 is matched to the two memory reads 645, and BB_ID 3 is matched to memory write 647, as shown in FIG. 6.

Figure 7:
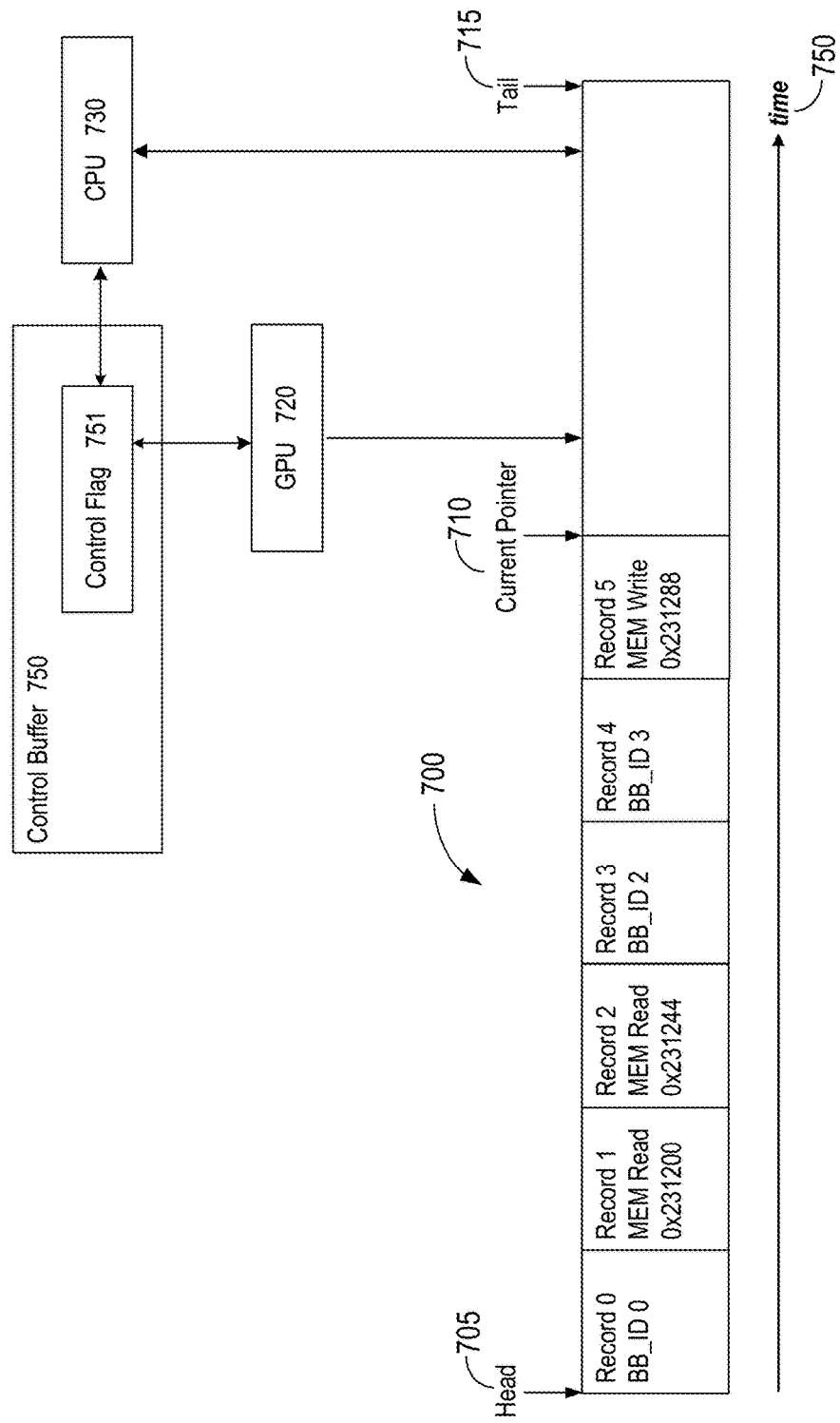
FIG. 7 illustrates example trace buffer content when both example dynamic trace types of FIG. 6 are implemented, in accordance with various embodiments.

FIG. 7 shows an example trace buffer containing content generated by the same example instrumented binary code used in the example of FIG. 6, where both instruction traces and memory traces are implemented. Trace buffer 700 thus includes a sequential series of dynamic trace records generated by the example instrumented GPU code and written to trace buffer 700. Trace buffer 700 is similar to trace buffer 100 of FIG. 1, albeit with actual BB_IDs and memory traces provided in each of its records. Trace buffer 700 may be communicatively coupled to both CPU 730 and GPU 720, each of which are further communicatively coupled to control buffer 750, in which is provided control flag 751. The cooperative relationships between trace buffer 700, control buffer 750 and its control flag 751, CPU 730 and GPU 720 were described in detail above in connection with their analogous counterparts shown in FIG. 1, and need not be repeated here.

Continuing with reference to FIG. 7, Trace buffer 700 has a starting memory location of Head 705, an ending location of Tail 715, and a current pointer 710. In all, buffer 700 contains six example records. Record 0 is an instruction trace, showing that BB_ID 0 was first executed. Records 1 and 2 are each memory traces, each indicating that a read was performed at a certain memory address. Record 3 is an instruction trace, indicating that BB_ID 2 was executed, and Record 4 is also an instruction trace, indicating that BB_ID 3 was executed. Finally, Record 5 is a memory trace, indicating that a memory write occurred at memory address 0x231288.

Because the records of trace buffer 700 are temporally sequential, as shown by time axis 750, in post processing a CPU may associate the two memory reads of Records 1 and 2 with BB_ID 0, and may also associate the memory write of Record 5 with BB_ID 3. This is how the merged traces 640 of FIG. 6 may be generated, in embodiments. As noted in connection with FIG. 6, BB_ID 2 did not include any memory operations, accordingly there is no corresponding memory trace record for BB_ID 2, as BB_ID 3 followed in time BB_ID 2 and the memory access of Record 5 was subsequent in time to the execution of BB_ID 3.

Next described are techniques for reconstructing BBs that may have been executed in a given binary code on a GPU, but for reasons described below, were not instrumented, and therefore no dynamic trace data was generated when they were executed, in accordance with various embodiments. BB reconstruction is needed in such embodiments in order to generate a complete program trace.

It is here noted that ideal embodiments may be those in which every BB of the binary code may be instrumented and run. In such embodiments, BB_ID data may simply be read in order to construct a program trace. However, it is noted that in some cases there may be technical difficulties when control-flow changing blocks (e.g., BBs with if, then, switch, jump, etc. instructions) because sometimes this may lead to instability. To address that situation, in embodiments, a mechanism of constructing a program trace only from using *normal* basic blocks (i.e., non control-flow changing BBs) may be implemented. Next described are various techniques of Basic Block (BB) Path finding for dynamic trace data generated by binary code whose non control-flow changing blocks were the only ones instrumented. Thus, in embodiments, if control-flow changing instructions are not able to be instrumented, for whatever reasons, these mechanisms may be used to post-process trace buffer content and reconstruct a most probable execution path of the program.

Figure 8A:
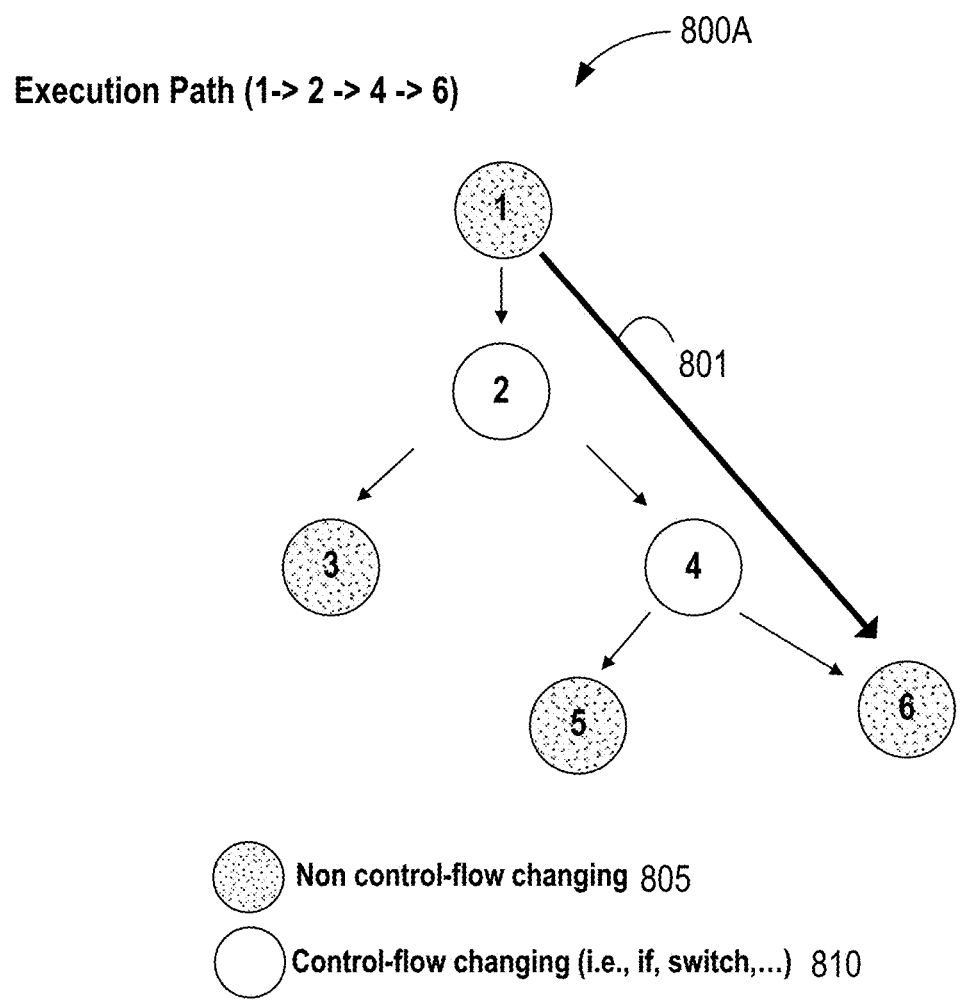
FIG. 8A illustrates an example control flow graph of an example program, used to infer non-control-flow changing basic blocks in forward program flow, in accordance with various embodiments.

FIG. 8A schematically illustrates an example control flow graph of an example program, and an example algorithm to infer non-control-flow changing basic blocks in forward program flow, in accordance with various embodiments. With reference thereto, FIG. 8A illustrates an example program execution path 801 between starting BB 1 and ending BB 6. Path 801 includes four BBs, namely starting BB_ID 1, BB_ID 2, BB_ID 4, and ending BB_ID 6. Thus, succinctly, the execution path is, as shown: 1→2→4→6. In this example, BB_IDs 2 and 4, although in the program, were not instrumented, so no instruction trace was generated for them. Thus, the data in the trace buffer only shows instruction traces for the four not control-flow changing BBs. In FIG. 8A, control-flow changing BBs are shown as a white circle 810, and non control-flow changing BBs 805 are shown as a shaded circle.

In embodiments, to find the actual execution path algorithmically, a recursion-based function, called, for example, FindPath, may be used. The recursive function may, for example, take as inputs a starting BB_ID and an ending BB_ID, which may be obtained from a control flow graph of the example program (available to the CPU from when it instrumented the binary code). In embodiments, the recursive function may implement the following commented pseudocode:

```
FindPath(startBB, endBB, . . . )
FindPath (1, 6, . . . )
        FindPath (2, 6, . . . )
            FindPath (3, 6, . . . )      // No possible child of BB_ID 3 as
                                         // path to BB_ID 6
            FindPath (4, 6, . . . )
                FindPath (5, 6, . . . )  // No possible child of BB_ID 5 as
                                         // path to BB_ID 6
                FindPath (6, 6, . . . )  // Match (6 == 6)
OutputPath = 1, 2, 4, 6
```

The recursion starts with FindPath(startBB, endBB), or here, for example, Find (1, 6) as 1 is the starting BB and 6 is the ending BB, as seen from the data in trace buffer. In embodiments, the goal is to find the program's path from BB 1 to BB 6. In embodiments, all available children of startBB (child1, child2, . . . ) may be recursively called, as shown by the statements FindPath(child1, endBB). After each such function call to FindPath, it may be determined if the childBB has a possible path to endBB, by that childBB having its own childBBs. If it does not, that childBB is deleted from the possible execution path, and no further function call is made on that subpath (as there are no more childBBs to call). The process may finish only if endBB is reached, i.e., the last call of FindPath is to a childBB that matches endBB, as in this example, FindPath(6,6), where BB 6 is the last child of BB 4 to try, following deletion of childBB 5 after the call FindPath (5,6), as shown.

In embodiments, once a match between childBB and endBB is detected, i.e., when FindPath(endBBL, endBBL) is called, the function may terminate. As shown in FIG. 8A, the process did find a match, and thus the path has been found, OutputPath=(1→2→4→6).

Figure 8B:
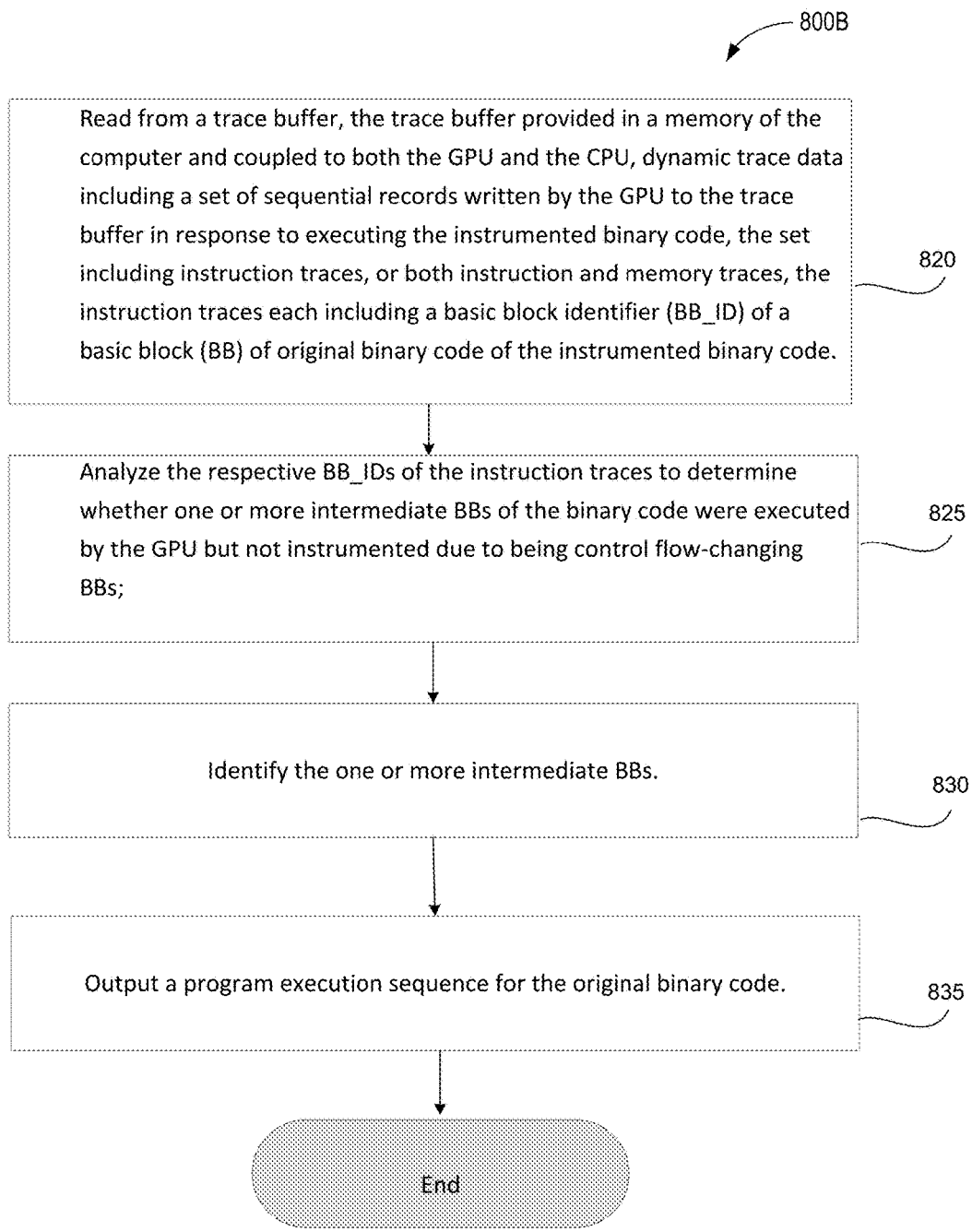
FIG. 8B illustrates an overview of the operational flow of a process for post-processing dynamic trace data, in accordance with various embodiments.

With reference to FIG. 8B, an overview of the operational flow of a process 800B, to be run on an example CPU of a computer, for post-processing dynamic trace data generated by instrumented binary code running on a GPU of the computer, in accordance with various embodiments, is presented. Process 800B may include blocks 820 through 835. In alternate embodiments, process 800B may have more or less operations, and some of the operations may be performed in different order.

Process 800B may begin at block 820, where dynamic trace data may be read from a trace buffer, the trace buffer provided in a memory of the computer and coupled to both the GPU and the CPU. The dynamic trace data may include a set of sequential records written by the GPU to the trace buffer in response to executing the instrumented binary code, the set including instruction traces, or both instruction and memory traces, the instruction traces each including a basic block identifier (BB_ID) of a basic block (BB) of original binary code of the instrumented binary code.

From block 820, process 800B may proceed to block 825, where the respective BB_IDs of the instruction traces may be analyzed to determine whether one or more intermediate BBs of the original binary code were executed by the GPU but not instrumented due to being control flow-changing BBs.

From block 825, process 800B may proceed to block 830, where the one or more intermediate BBs may be identified. Finally, from block 830, process 800B may proceed to block 835, where a program sequence for the original binary code may be output, the program sequence including both the BBs that were instrumented, and the intermediate BBs that were executed by the GPU, but not instrumented.

At block 835, process 800B may then terminate.

Figure 8C:
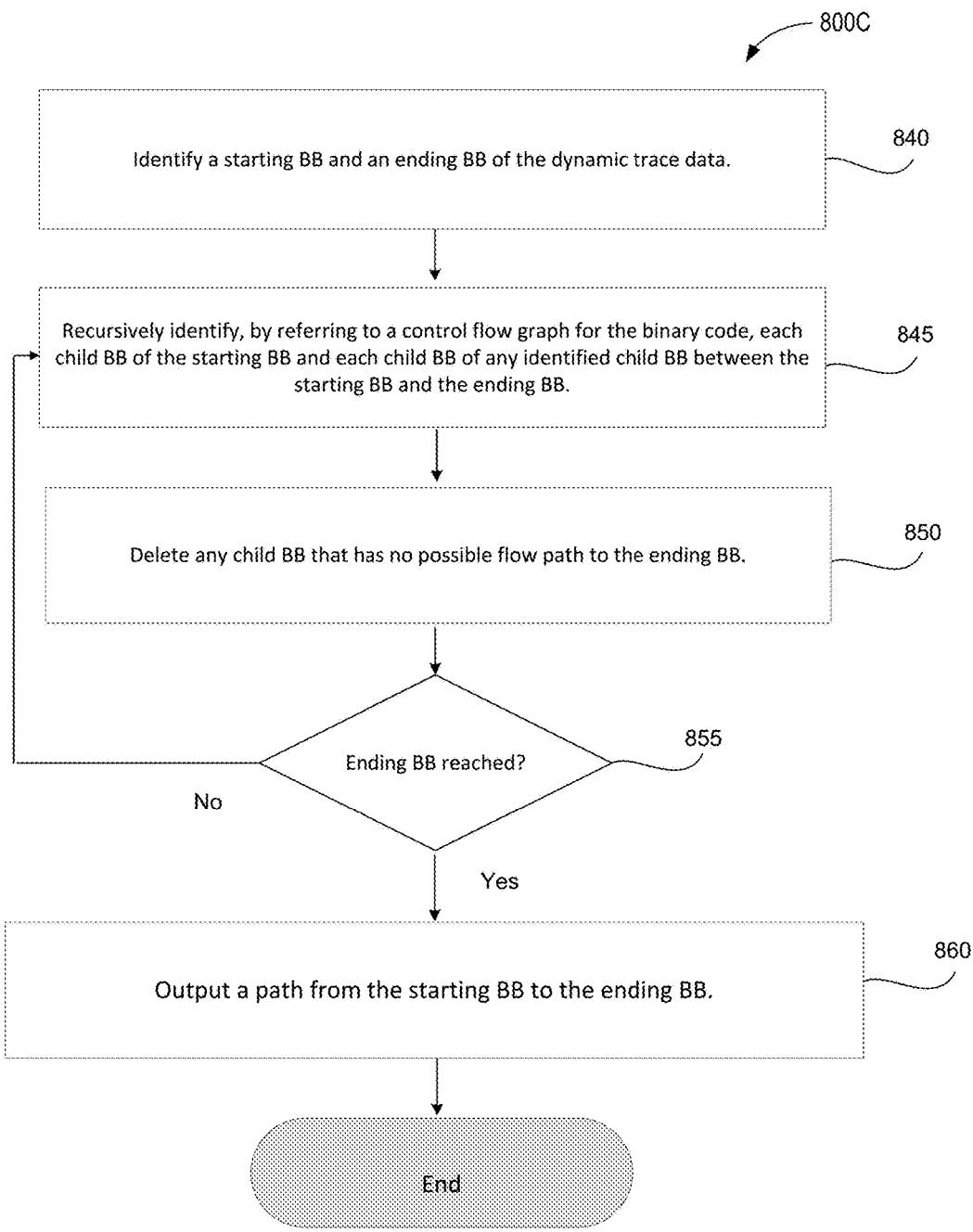
FIG. 8C illustrates an overview of the operational flow of a process for identifying intermediate basic blocks of binary code not recorded in a dynamic trace generated by a GPU of a computer, in accordance with various embodiments.

With reference to FIG. 8C, an overview of the operational flow of a process 800C, to run on an example CPU, for identifying intermediate basic blocks of binary code not recorded in a dynamic trace generated by a GPU of a computer, in accordance with various embodiments, is presented. Process 800C may include blocks 840 through 860. In alternate embodiments, process 800C may have more or less operations, and some of the operations may be performed in different order. Process 800C illustrates one example algorithm for the analysis, identification and program sequence output illustrated in blocks 825, 830 and 835 of FIG. 8B, as described above with reference to FIG. 8B, and implements the example algorithm described in connection with FIG. 8A.

Process 800C may begin at block 840, where a starting BB and an ending BB of the dynamic trace data may be identified. For example, with reference to FIG. 8A, the trace buffer may include records for each of BBs 1, 3, 5 and 6, because those BBs were instrumented in the instrumented binary code run on an example GPU. However, the dynamic trace data may not include records for either BB 2 or BB 4, as those are control-flow changing BBs, as described above. In embodiments, process 800C may identify the lowest BB_ID, and the highest BB_ID, for which dynamic trace data was generated, and thereby use those respective BB_IDs to identify, in this example, BB 1 as the starting BB and BB 6 as the ending BB.

From block 840, process 800C may proceed to block 845, where, by referring to a control flow graph for the binary code, each child BB of the starting BB and each child BB of any identified child BB between the starting BB and the ending BB may be recursively identified. Thus, for example, using the example set of BBs for the example program of FIG. 8A, BB 2 may be identified as a childBB of BB 1, and BBs 3 and 4 may be identified as childBBs of childBB 2.

From block 845, process 800C may proceed to block 850, where any child BB that has no possible flow path to the ending BB may be deleted from the possible flow path being reconstructed. For example, using the example set of BBs for the example program of FIG. 8A, it may be determined that childBB 3 of childBB 2, which has no children of its own, cannot be in an execution path to endBB 6. Similarly, childBB 5 of childBB 4 also has no children, and thus no possible execution path to endBB6. Thus, in embodiments, at block 850, BBs 3 and 5 may be deleted.

From block 850, process 800C may proceed to query block 855, where it may be determined if the identified ending BB has been reached. If Yes, then process 800C may proceed to block 860, where a path from the starting BB to the ending BB for the original binary code may be output, the program sequence including both the BBs that were instrumented, and the intermediate BBs that were executed by the GPU, but not instrumented, but identified using process 800C.

At block 860, process 800C may terminate.

Alternatively, if at query block 855 the response was No, then process 800C may return to block 845, and continue to identify child BBs, including child BBs of child BBs of child BBs, as may be the case, then proceed to block 850 to delete any identified child BB that has no possible flow path to the ending BB, and once again proceed to query block 855. Process 800C may loop through blocks 845, 850 and 855 until a Yes is returned at query block 855, and thus the ending BB is reached. As described above, from query block 855 process 800C may then proceed to block 860, output the execution path from starting BB to ending BB, and then terminate.

Figure 9:
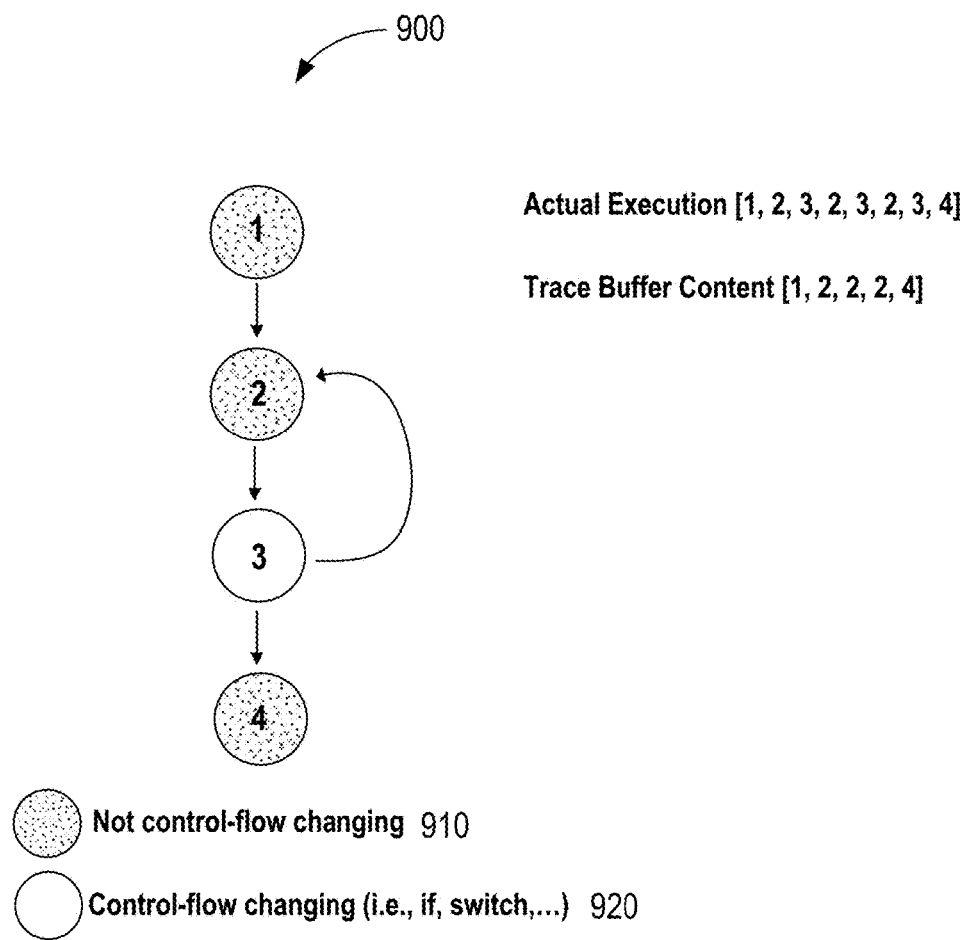
FIG. 9 illustrates an example algorithm to infer control-flow changing blocks in backward program flow, in accordance with various embodiments.

FIG. 9 schematically illustrates an example algorithm to infer non-traced control-flow changing basic blocks in backward program flow, in accordance with various embodiments. It is here noted that while FIGS. 8A and 8C illustrate the handling of forward path finding via recursion, the example method illustrated in those figures will not work for backward direction, i.e., where a control-flow changing BB jumps back to a prior BB. FIG. 9 illustrates such a scenario where, from the trace buffer data, it appears that the same BB, here BB_ID 2, was executed multiple times in a row. Recalling that in some embodiments no dynamic trace data is generated for control-flow changing BBs, this is the case with control-flow changing "jump back" BB_ID 2 in the example control flow graph of FIG. 9. Thus, in embodiments, when the trace buffer content shows the same BB_ID back-to-back two or more times, the following technique may be implemented.

In embodiments, process 900 may begin by iterating over every child (e.g., BB_ID 3, which in this case is the only one) of the repeated BB_ID. Next, if a child is a control-flow changing BB_ID, then it is a candidate BB_ID to be inserted in the execution path. Process 900 may then further check if the control-flow changing child BB has a negative index (e.g., as here, a jump instruction with a negative index). If so, the child may inserted after the repeated BB, here BB_ID 2. However, if there is no child of the repeated BB (in this example BB_ID 2), then process 900 may cause a warning message to be printed out, and the duplicate BB_ID may be treated as single count.

Figure 10:
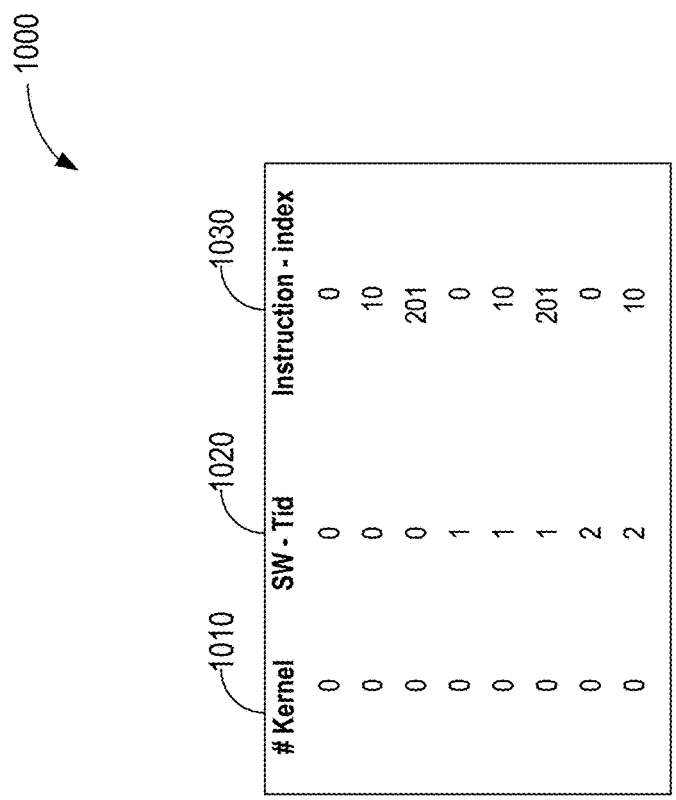
FIG. 10 illustrates an example trace output file, in accordance with various embodiments.

FIG. 10 illustrates an example trace output file 1000, in accordance with various embodiments. As noted above, in general, a GPU architecture may include tens of EU execution units that can execute programs simultaneously. Moreover, inside each EU, there may exist several hardware threads that can execute independently via context switching, for example. Thus, hundreds of hardware threads (which may be understood as an independent hardware unit) may be executing programs at the same time independently, with potential synchronization from time to time.

In embodiments, one file, which may be named, for example, "trace_x.out", may be generated for every hardware thread, where "x" refers to the hardware thread number. When one kernel is finished, a next waiting-program may then execute on the EU. With reference to FIG. 10, the trace output file shows which kernel 1010 is executed, SW-Tid 1020 identifies the software thread ID, and instruction-index 1030 refers to the BB_ID. Thus, in the example of FIG. 10, in the instrumented binary code BB_ID 0 was first executed, followed by BB_ID 10, and then BB_ID 201. When one program is finished, a next program begins, increases the software thread ID 1020 by 1, and then repeats the execution. As noted above, an instruction trace may be expanded to include instruction names, and memory access instructions may be implemented as well, and merged traces generated to provide a full trace.

Figure 11:
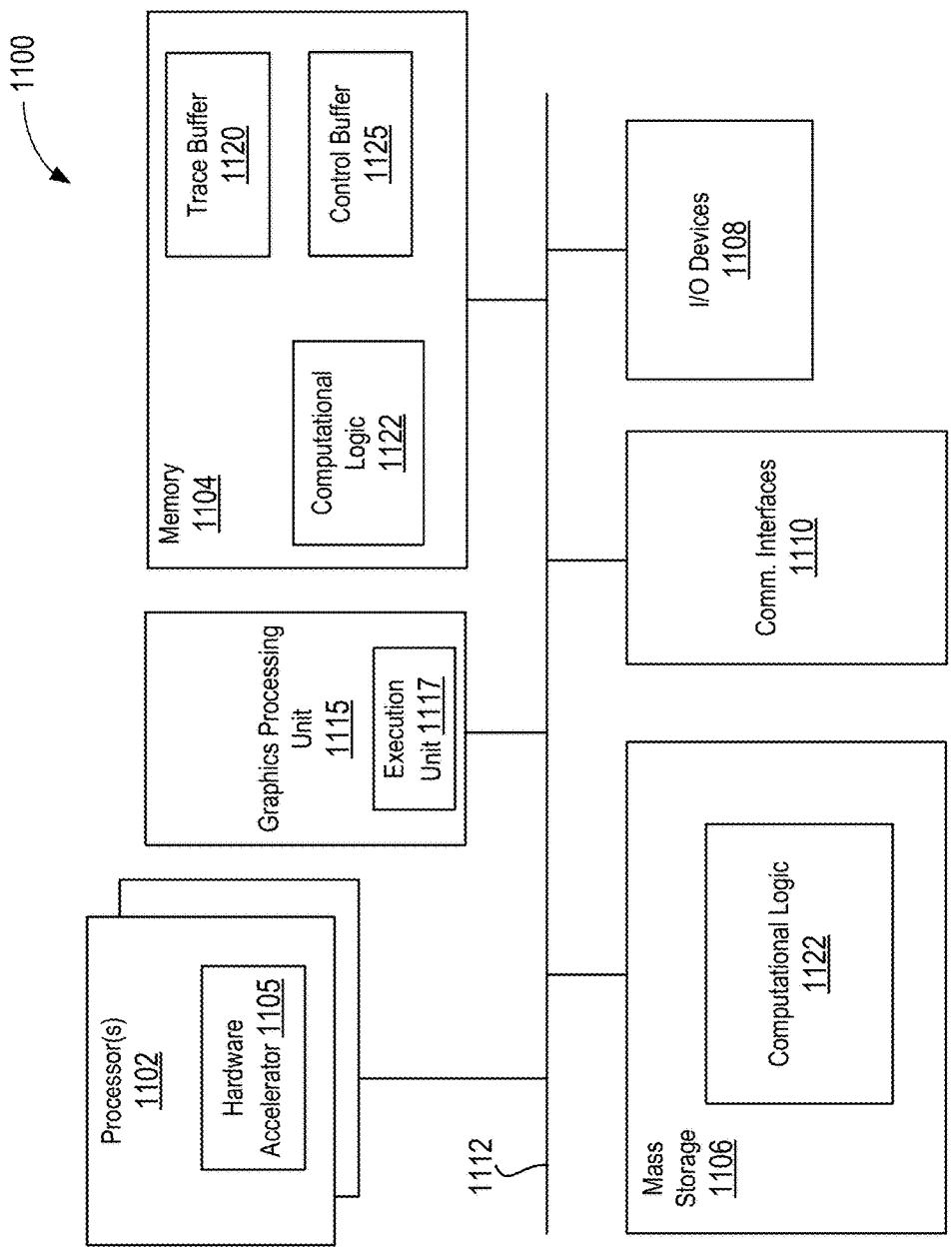
FIG. 11 illustrates a block diagram of a computer device suitable for practicing the present disclosure, in accordance with various embodiments.

Referring now to FIG. 11 wherein a block diagram of a computer device suitable for practicing the present disclosure, in accordance with various embodiments, is illustrated. As shown, computer device 1100 may include one or more processors 1102, memory controller 1103, and system memory 1104. Within system memory 1104 there may be allocated several buffers, including, for example, Trace Buffer 1120, and Control Buffer 1125. For example, these buffers may be allocated in System Memory by Processor(s) 1102, for example, calling a memory allocation program or routine, such as, for example, a call to malloc( ). Each processor 1102 may include one or more processor cores, and hardware accelerator 1105. An example of hardware accelerator 1105 may include, but is not limited to, programmed field programmable gate arrays (FPGA). In embodiments, processor 1102 may also include a memory controller (not shown). In embodiments, system memory 1104 may include any known volatile or non-volatile memory.

Computer device 1100 may also include Graphics Processing Unit 1115, which may include one or more Execution Units 1117. Additionally, computer device 1100 may include mass storage device(s) 1106 (such as solid state drives), input/output device interface 1108 (to interface with various input/output devices, such as, mouse, cursor control, display device (including touch sensitive screen), and so forth) and communication interfaces 1110 (such as network interface cards, modems and so forth). In embodiments, communication interfaces 1110 may support wired or wireless communication, including near field communication. The elements may be coupled to each other via system bus 1112, which may represent one or more buses. In the case of multiple buses, they may be bridged by one or more bus bridges (not shown).

Each of these elements may perform its conventional functions known in the art. In particular, system memory 1104 and mass storage device(s) 1106 may be employed to store a working copy and a permanent copy of the executable code of the programming instructions of an operating system, one or more applications, and/or various software implemented components to practice aspects of the present disclosure described above, collectively referred to as computing logic 1122. The programming instructions implementing computing logic 1122 may comprise assembler instructions supported by processor(s) 1102 or high-level languages, such as, for example, C, that can be compiled into such instructions. In embodiments, some of computing logic may be implemented in hardware accelerator 1105. In embodiments, part of computational logic 1122, e.g., a portion of the computational logic 1122 associated with the runtime environment of the compiler, may be implemented in hardware accelerator 1105.

The permanent copy of the executable code of the programming instructions or the bit streams for configuring hardware accelerator 1105 may be placed into permanent mass storage device(s) 1106 and/or hardware accelerator 1105 in the factory, or in the field, through, for example, a distribution medium (not shown), such as a compact disc (CD), or through communication interface 1110 (from a distribution server (not shown)). While for ease of understanding, the compiler and the hardware accelerator that executes the generated code that incorporate the predicate computation teaching of the present disclosure to increase the pipelining and/or parallel execution of nested loops are shown as being located on the same computing device, in alternate embodiments, the compiler and the hardware accelerator may be located on different computing devices.

The number, capability and/or capacity of these elements 1110-1112 may vary, depending on the intended use of example computer device 1100, e.g., whether example computer device 1100 is a smartphone, tablet, ultrabook, a laptop, a server, a set-top box, a game console, a camera, and so forth. The constitutions of these elements 1110-1112 are otherwise known, and accordingly will not be further described.

Figure 12:
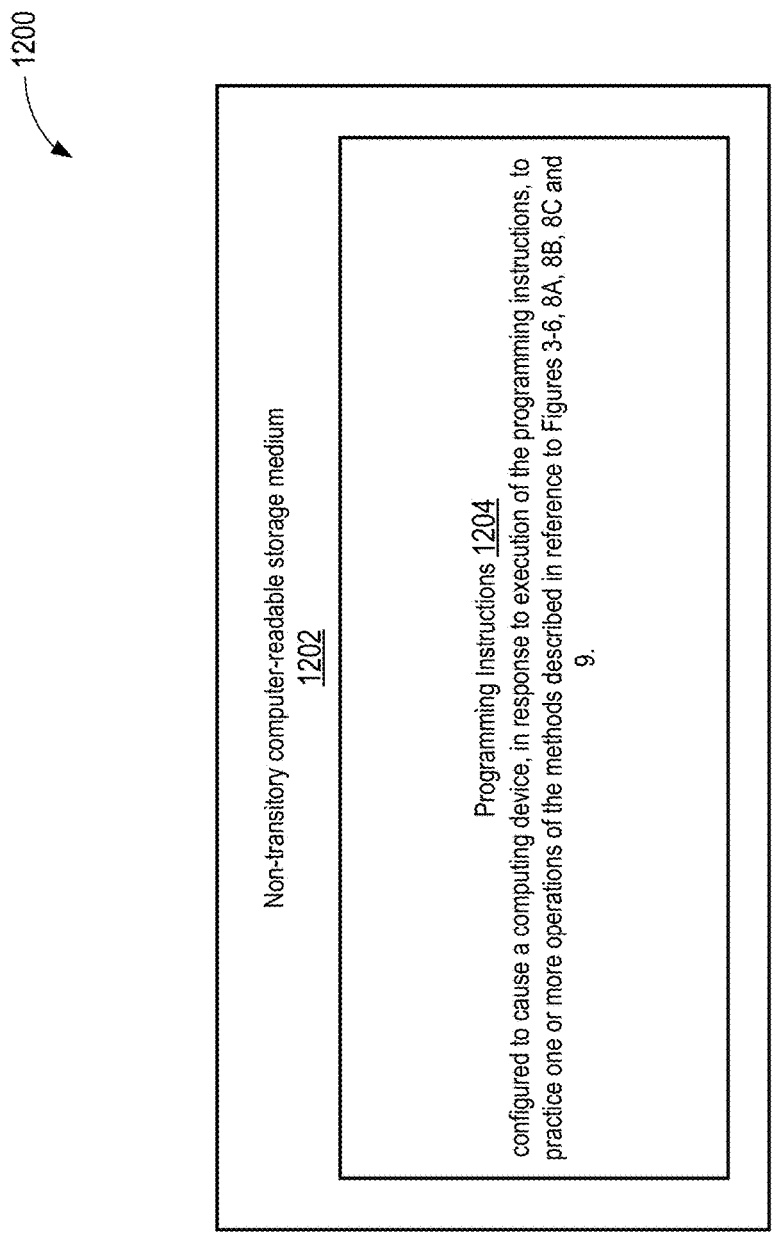
FIG. 12 illustrates an example computer-readable storage medium having instructions configured to practice aspects of the processes of FIGS. 2-6, 8A, 8B, 8C and 9, in accordance with various embodiments.

FIG. 12 illustrates an example computer-readable storage medium having instructions configured to implement and/or practice (aspects of) processes 300 of FIG. 3, 400 of FIG. 4, 500 of FIG. 5, 600 of FIG. 6, 800A of FIG. 8A, 800B of FIG. 8B, 800C of FIG. 8C, and/or 900 of FIG. 9, earlier described, in accordance with various embodiments. As illustrated, computer-readable storage medium 1202 may include the executable code of a number of programming instructions or bit streams 1204. Executable code of programming instructions (or bit streams) 804 may be configured to enable a device, e.g., computer device 1100, in response to execution of the executable code/programming instructions (or operation of an encoded hardware accelerator 1175), to perform (aspects of) process 300 of FIG. 3, process 400 of FIG. 4, process 500 of FIG. 5, 600 of FIG. 6, 800A of FIG. 8A, 800B of FIG. 8B, 800C of FIG. 8C, and/or 900 of FIG. 9. In alternate embodiments, executable code/programming instructions/bit streams 1204 may be disposed on multiple non-transitory computer-readable storage medium 1202 instead. In embodiments, computer-readable storage medium 1202 may be non-transitory. In still other embodiments, executable code/programming instructions 1204 may be encoded in transitory computer readable medium, such as signals.

Referring back to FIG. 11, for one embodiment, at least one of processors 1102 may be packaged together with a computer-readable storage medium having some or all of computing logic 1122 (in lieu of storing in system memory 1104 and/or mass storage device 1106) configured to practice all or selected ones of the operations earlier described with reference to FIGS. 3-6, 8A, 8B, 8C and 9. For one embodiment, at least one of processors 1102 may be packaged together with a computer-readable storage medium having some or all of computing logic 1122 to form a System in Package (SiP). For one embodiment, at least one of processors 1102 may be integrated on the same die with a computer-readable storage medium having some or all of computing logic 1122. For one embodiment, at least one of processors 1102 may be packaged together with a computer-readable storage medium having some or all of computing logic 1122 to form a System on Chip (SoC). For at least one embodiment, the SoC may be utilized in, e.g., but not limited to, a hybrid computing tablet/laptop.

Illustrative examples of the technologies disclosed herein are provided below. An embodiment of the technologies may include any one or more, and any combination of, the examples described below.

EXAMPLES

Example 1 may include an apparatus for generating dynamic trace data of binary code running on a Graphics Processing Unit (GPU), comprising: an input interface disposed in the GPU to receive instrumented binary code and communication data; an output interface disposed in the GPU, and coupled to a memory of a computer hosting the GPU, the memory further coupled to the input interface, and a Central Processing Unit (CPU) of the computer, the memory having a trace buffer and a control buffer, the control buffer including an overflow flag of the trace buffer; and an execution unit (EU) disposed in the GPU, and coupled to the input interface and the output interface, to conditionally execute the instrumented binary code and generate dynamic trace data of the binary code in response to the overflow flag being not set to indicate an overflow condition.

Example 2 may include the apparatus of example 1, and/or any other example herein, further to determine, via the input interface, whether the overflow flag indicates an overflow, wherein the CPU clears the overflow flag in response to a determination that the overflow flag is set to indicate an overflow.

Example 3 may include the apparatus of example 1, and/or any other example herein, further to store, via the output interface, the trace data in the trace buffer when the flag does not indicate overflow, or stop execution of the code and poll the overflow flag until it is cleared, when the flag indicates overflow.

Example 4 may include the apparatus of example 2, and/or any other example herein, wherein to store the dynamic trace data includes to save an individual record of the dynamic trace data in the trace buffer, and to update a location of a current pointer of the trace buffer.

Example 5 may include the apparatus of example 4, and/or any other example herein, wherein when the current pointer location is the same as that of an ending location of the trace buffer, the EU is further to: stop execution of the instrumented binary code; and set, via the output interface, the overflow flag.

Example 6 may include the apparatus of example 1, and/or any other example herein, wherein the instrumented binary code is generated from the binary code, and wherein each record of the dynamic trace data contains profiling information descriptive of the execution of the binary code on the EU, the profiling information including at least one of: an IP address of a basic block of the binary code; an address in the memory to be read or written from by the binary code; a time stamp; an access size; and a thread ID of the binary code.

Example 7 may include the apparatus of example 1, and/or any other example herein, wherein generating dynamic trace data includes at least one of: generating an instruction trace that records which basic block of the binary code was executed, and generating a memory access trace that records which memory type was executed, and at which dynamic memory address.

Example 8 may include the apparatus of example 7, and/or any other example herein, wherein an instruction or a memory access that is included in a basic block of the binary code that is not control-flow changing is not recorded in the trace buffer.

Example 9 may include an apparatus for managing dynamic trace data of binary code, comprising: a memory having a trace buffer to receive the dynamic trace data conditionally generated by execution of instrumented binary code running on a Graphics Processing Unit (GPU) of the apparatus, wherein the memory further includes a control buffer having an overflow flag of the trace buffer, wherein the GPU executes the instrumented binary code and causes the dynamic trace data to be generated, when the overflow flag does not indicate an overflow condition; and a CPU coupled to the memory to control the overflow indication of the overflow flag to regulate the execution of the instrumented binary code and generation of the dynamic trace data by the GPU.

Example 10 may include the apparatus of example 9, and/or any other example herein, wherein the trace buffer and the control buffer are pre-allocated in the memory by the CPU.

Example 11 may include the apparatus of example 9, and/or any other example herein, wherein the overflow flag is continually polled by the CPU to determine if it is set.

Example 12 may include the apparatus of example 9, and/or any other example herein, further to, prior to clearing the overflow flag: post-process the dynamic trace data in contents of the trace buffer; store the post-processed data in memory; and erase the trace buffer.

Example 13 may include the apparatus of example 12, and/or any other example herein, wherein the dynamic trace data includes one or more instruction records and one or more memory access records for the binary code, and wherein post-process the contents of the trace buffer includes to analyze the instruction records and the memory access records to associate each memory access with its underlying instruction of the binary code.

Example 14 may include one or more non-transitory computer-readable storage media comprising a set of instructions, which, when executed on a processor, cause the processor to instrument binary code for execution on a Graphics Processing Unit (GPU), including to: divide the binary code into basic blocks (BBs) and insert profiling code at the beginning of each BB to write a dynamic instruction trace, including a BB identifier, to a trace buffer provided in a memory of a host computer of the GPU, the memory coupled to the GPU; or identify memory instructions in the binary code and insert an instrumentation routine into each instruction to write a dynamic memory trace, including a memory type and a dynamic memory address, to the trace buffer, wherein the trace buffer has an associated overflow flag, the profiling code writes the dynamic instruction trace when the overflow flag is not set to indicate an overflow condition, and the overflow flag, when set to indicate an overflow condition, is reset by the CPU of the computer.

Example 15 may include the one or more non-transitory computer-readable storage media of example 14, and/or any other example herein, wherein the memory type of the dynamic memory trace is one of read or write.

Example 16 may include the one or more non-transitory computer-readable storage media of example 14, and/or any other example herein, the instrumented binary code further comprising code that causes the GPU to: receive and execute the instrumented binary code on an execution unit (EU) of the GPU to generate and write the dynamic traces to the trace buffer.

Example 17 may include the one or more non-transitory computer-readable storage media of example 14, and/or any other example herein, wherein the instruction trace further comprises an instruction executed in the BB.

Example 18 may include the one or more non-transitory computer-readable storage media of example 14, and/or any other example herein, wherein the binary code is instrumented to write both a dynamic instruction trace record for each BB, and a dynamic memory trace record for each BB that contains a memory access instruction, to the trace buffer.

Example 19 may include the one or more non-transitory computer-readable storage media of example 14, and/or any other example herein, the instrumented code not including profiling code inserted at the beginning of BBs that are control-flow changing blocks, such that, when executed by the GPU, no record is to be written to the trace buffer for a control-flow changing block of the binary code.

Example 20 may include the one or more non-transitory computer-readable storage media of example 14, and/or any other example herein, the instrumented code further comprising code that, when executed by the EU, causes the GPU to: determine, prior to writing the dynamic traces to the trace buffer, that the trace buffer is in an overflow condition, and in response to the determination, stop execution of the instrumented code, and wait until the trace buffer has been flushed by a CPU of the host computer that is coupled to the memory to continue execution.

Example 21 may include the one or more non-transitory computer-readable storage media of example 20, and/or any other example herein, the instrumented code further comprising code that, when executed, causes the GPU to determine: that the trace buffer is in an overflow condition, or that the trace buffer has been flushed by the CPU after being in an overflow condition, by reading an overflow flag stored in a control buffer provided in the memory.

Example 22 may include a method, performed by a CPU of a computer, of post-processing dynamic trace data generated by a GPU of the computer from executing instrumented binary code, comprising: reading from a trace buffer, the trace buffer provided in a memory of the computer and coupled to both the GPU and the CPU, dynamic trace data including a set of sequential records written by the GPU to the trace buffer in response to executing the instrumented binary code, the set including instruction traces, or both instruction and memory traces, the instruction traces each including a basic block identifier (BB_ID) of a basic block (BB) of original binary code of the instrumented binary code; analyzing the respective BB_IDs of the instruction traces to determine whether one or more intermediate BBs of the binary code were executed by the GPU but not instrumented due to being control flow-changing BBs; identifying the one or more intermediate BBs; and outputting a program execution sequence for the original binary code.

Example 23 may include the method of example 22, and/or any other example herein, wherein identifying the one or more intermediate BBs further comprises: identifying a starting BB and an ending BB of the dynamic trace data; recursively identifying, by referring to a control flow graph for the binary code, each child BB of the starting BB and each child BB of any identified child BB between the starting BB and the ending BB; deleting any child BB that has no possible flow path to the ending BB; continuing until the ending BB is reached; and outputting a path from the starting BB to the ending BB.

Example 24 may include the method of example 22, and/or any other example herein, further comprising terminating the identifying if the ending BB is not reached.

Example 25 may include the method of example 22, and/or any other example herein, wherein identifying the one or more intermediate BBs further comprises: identifying a BB that is repeated in adjacent instruction traces in the dynamic trace data; iterating over every child BB of the repeated BB to: find a control-flow changing child BB; and determine if the control-flow changing child has a negative index; inserting the child BB with a negative index after the repeated BB in the path to the ending BB; and outputting a path from the starting BB to the ending BB.

Example 26 may include a method, performed by a CPU of a computer, of instrumenting binary code for execution on a Graphics Processing Unit (GPU), including: dividing the binary code into basic blocks (BBs) and inserting profiling code at the beginning of each BB to write a dynamic instruction trace, including a BB identifier, to a trace buffer provided in a memory of a host computer of the GPU, the memory coupled to the GPU; or identifying memory instructions in the binary code and inserting an instrumentation routine into each instruction to write a dynamic memory trace, including a memory type and a dynamic memory address, to the trace buffer, wherein the trace buffer has an associated overflow flag, the profiling code writes the dynamic instruction trace when the overflow flag is not set to indicate an overflow condition, and the overflow flag, when set to indicate an overflow condition, is reset by the CPU of the computer.

Example 27 may include the method of example 26, and/or any other example herein, wherein the memory type of the dynamic memory trace is one of read or write.

Example 28 may include the method of example 26, and/or any other example herein, wherein instrumenting the binary code further comprises inserting code that causes the GPU to: receive and execute the instrumented binary code on an execution unit (EU) of the GPU to generate and write the dynamic traces to the trace buffer.

Example 29 may include the method of example 26, and/or any other example herein, wherein the instruction trace further comprises an instruction executed in the BB.

Example 30 may include the method of example 26, and/or any other example herein, wherein instrumenting the binary code includes inserting code that causes the GPU to write both a dynamic instruction trace record for each BB, and a dynamic memory trace record for each BB that contains a memory access instruction, to the trace buffer.

Example 31 may include the method of example 26, and/or any other example herein, wherein instrumenting the binary code does not include inserting profiling code at the beginning of BBs that are control-flow changing blocks, such that, when executed by the GPU, no record is written to the trace buffer for a control-flow changing block of the binary code.

Example 32 may include the method of example 26, and/or any other example herein, wherein instrumenting the binary code further comprises inserting code that, when executed by the EU, causes the GPU to: determine, prior to writing the dynamic traces to the trace buffer, that the trace buffer is in an overflow condition, and in response to the determination, stop execution of the instrumented code, and wait until the trace buffer has been flushed by a CPU of the host computer that is coupled to the memory to continue execution.

Example 33 may include the method of example 26, and/or any other example herein, wherein instrumenting the binary code further comprises inserting code that, when executed by the EU, causes the GPU to: determine that the trace buffer is in an overflow condition, or that the trace buffer has been flushed by the CPU after being in an overflow condition, by reading an overflow flag stored in a control buffer provided in the memory.

Example 34 may include an apparatus for computing, comprising: input means disposed in a GPU to receive instrumented binary code and communication data; output means disposed in the GPU, and coupled to a storage means of a computer hosting the GPU, the storage means further coupled to the input means, and a processing means of the computer, the storage means including a trace buffer means and a control buffer means, the control buffer means including an overflow indication means of the trace buffer means; and a means for execution disposed in the GPU, and coupled to the input means and the output means, the means for execution to conditionally execute the instrumented binary code and generate dynamic trace data of the binary code, in response to the overflow indication means being not set to indicate an overflow condition.

Example 35 may include an apparatus for computing, comprising: storage means having trace buffering means to receive dynamic trace data conditionally generated by execution of instrumented binary code on graphics processing means of the apparatus for computing, wherein the storage means further includes control buffering means having an overflow indication means of the trace buffering means, wherein the graphics processing means executes the instrumented binary code and causes the dynamic trace data to be generated, when the overflow indication means does not indicate an overflow condition; and processing means coupled to the storage means to control the overflow indication of the overflow indication means to regulate the execution of the instrumented binary code and generation of the dynamic trace data by the graphics processing means.

Example 36 may include an apparatus for computing to instrument binary code for execution on a Graphics Processing Unit (GPU), comprising: means to divide the binary code into basic blocks (BBs) and means to insert profiling code at the beginning of each BB to write a dynamic instruction trace, including a BB identifier, to a trace buffer provided in a memory of a host computer of the GPU, the memory coupled to the GPU; or means to identify memory instructions in the binary code and means to insert an instrumentation routine into each instruction to write a dynamic memory trace, including a memory type and a dynamic memory address, to the trace buffer, wherein the trace buffer has an associated overflow flag, the profiling code writes the dynamic instruction trace when the overflow flag is not set to indicate an overflow condition, and the overflow flag, when set to indicate an overflow condition, is reset by the apparatus for computing.

Example 37 may include an apparatus for computing, comprising: means to read from trace buffering means, the trace buffering means provided in storage means of the apparatus and coupled to both graphics processing means of the apparatus and processing means of the apparatus, dynamic trace data including a set of sequential records written by the graphics processing means to the trace buffering means in response to the graphics processing means executing instrumented binary code, the set of sequential records including instruction traces, or both instruction and memory traces, the instruction traces each including a basic block identifier (BB_ID) of a basic block (BB) of original binary code of the instrumented binary code; means to analyze the respective BB_IDs of the instruction traces to determine whether one or more intermediate BBs of the binary code were executed by the GPU but not instrumented due to being control flow-changing BBs; means to identify the one or more intermediate BBs; and means to output a program execution sequence for the original binary code.

What is claimed is:

1. An apparatus for generating dynamic trace data of binary code running on a Graphics Processing Unit (GPU), comprising:
    an input interface disposed in the GPU to receive instrumented binary code and communication data;
    an output interface disposed in the GPU, and coupled to a memory of a computer hosting the GPU, the memory further coupled to the input interface, and a Central Processing Unit (CPU) of the computer, the memory having a trace buffer and a control buffer, the control buffer including an overflow flag of the trace buffer; and
    an execution unit (EU) disposed in the GPU, and coupled to the input interface and the output interface, to conditionally execute the instrumented binary code and generate dynamic trace data of the binary code in response to the overflow flag being not set to indicate an overflow condition.

2. The apparatus of claim 1, further to determine, via the input interface, whether the overflow flag indicates an overflow, wherein the CPU clears the overflow flag in response to a determination that the overflow flag is set to indicate an overflow.

3. The apparatus of claim 1, further to store, via the output interface, the trace data in the trace buffer when the flag does not indicate overflow, or stop execution of the code and poll the overflow flag until it is cleared, when the flag indicates overflow.

4. The apparatus of claim 2, wherein to store the dynamic trace data includes to save an individual record of the dynamic trace data in the trace buffer, and to update a location of a current pointer of the trace buffer.

5. The apparatus of claim 4, wherein when the current pointer location is the same as that of an ending location of the trace buffer, the EU is further to:
    stop execution of the instrumented binary code; and
    set, via the output interface, the overflow flag.

6. The apparatus of claim 1, wherein the instrumented binary code is generated from the binary code, and wherein each record of the dynamic trace data contains profiling information descriptive of the execution of the binary code on the EU, the profiling information including at least one of:
    an IP address of a basic block of the binary code;
    an address in the memory to be read or written from by the binary code;
    a time stamp;
    an access size; and
    a thread ID of the binary code.

7. The apparatus of claim 1, wherein generating dynamic trace data includes at least one of:
    generating an instruction trace that records which basic block of the binary code was executed; and
    generating a memory access trace that records which memory type was executed, and at which dynamic memory address.

8. The apparatus of claim 7, wherein an instruction or a memory access that is included in a basic block of the binary code that is not control-flow changing is not recorded in the trace buffer.

9. An apparatus for managing dynamic trace data of binary code, comprising:
    a memory having a trace buffer to receive the dynamic trace data conditionally generated by execution of instrumented binary code running on a Graphics Processing Unit (GPU) of the apparatus, wherein the memory further includes a control buffer having an overflow flag of the trace buffer, wherein the GPU executes the instrumented binary code and causes the dynamic trace data to be generated, when the overflow flag does not indicate an overflow condition; and
    a CPU coupled to the memory to control the overflow indication of the overflow flag to regulate the execution of the instrumented binary code and generation of the dynamic trace data by the GPU.

10. The apparatus of claim 9, wherein the trace buffer and the control buffer are pre-allocated in the memory by the CPU.

11. The apparatus of claim 9, wherein the overflow flag is continually polled by the CPU to determine if it is set.

12. The apparatus of claim 9, further to, prior to clearing the overflow flag:
post-process the dynamic trace data in contents of the trace buffer;
store the post-processed data in memory; and
erase the trace buffer.

13. The apparatus of claim 12, wherein the dynamic trace data includes one or more instruction records and one or more memory access records for the binary code, and wherein post-process the dynamic trace data in contents of the trace buffer includes to analyze the instruction records and the memory access records to associate each memory access with its underlying instruction of the binary code.

14. One or more non-transitory computer-readable storage media comprising a set of instructions, which, when executed on a processor, cause the processor to instrument binary code for execution on a Graphics Processing Unit (GPU), including to:
divide the binary code into basic blocks (BBs) and insert profiling code at the beginning of each BB to write a dynamic instruction trace, including a BB identifier, to a trace buffer provided in a memory of a host computer of the GPU, the memory coupled to the GPU; or
identify memory instructions in the binary code and insert an instrumentation routine into each instruction to write a dynamic memory trace, including a memory type and a dynamic memory address, to the trace buffer;
wherein the trace buffer has an associated overflow flag, the profiling code writes the dynamic instruction trace when the overflow flag is not set to indicate an overflow condition, and the overflow flag, when set to indicate an overflow condition, is reset by a CPU of the computer.

15. The one or more non-transitory computer-readable storage media of claim 14,
wherein the memory type of the dynamic memory trace is one of read or write.

16. The one or more non-transitory computer-readable storage media of claim 14, the instrumented binary code further comprising code that causes the GPU to:
receive and execute the instrumented binary code on an execution unit (EU) of the GPU to generate and write the dynamic traces to the trace buffer.

17. The one or more non-transitory computer-readable storage media of claim 14,
wherein the instruction trace further comprises an instruction executed in the BB.

18. The one or more non-transitory computer-readable storage media of claim 14,
wherein the binary code is instrumented to write both a dynamic instruction trace record for each BB, and a dynamic memory trace record for each BB that contains a memory access instruction, to the trace buffer.

19. The one or more non-transitory computer-readable storage media of claim 14, the instrumented code not including profiling code inserted at the beginning of BBs that are control-flow changing blocks, such that, when executed by the GPU, no record is to be written to the trace buffer for a control-flow changing block of the binary code.

20. The one or more non-transitory computer-readable storage media of claim 14, the instrumented code further comprising code that, when executed by the EU, causes the GPU to:
determine, prior to writing the dynamic traces to the trace buffer, that the trace buffer is in an overflow condition, and in response to the determination, stop execution of the instrumented code, and wait until the trace buffer has been flushed by a CPU of the host computer that is coupled to the memory to continue execution.

21. The one or more non-transitory computer-readable storage media of claim 20, the instrumented code further comprising code that, when executed, causes the GPU to determine:
that the trace buffer is in an overflow condition, or
that the trace buffer has been flushed by the CPU after being in an overflow condition,
by reading an overflow flag stored in a control buffer provided in the memory.

22. A method, performed by a CPU of a computer, of post-processing dynamic trace data generated by a GPU of the computer from executing instrumented binary code, comprising:
reading from a trace buffer, the trace buffer provided in a memory of the computer and coupled to both the GPU and the CPU, dynamic trace data including a set of sequential records written by the GPU to the trace buffer in response to executing the instrumented binary code, the set including instruction traces, or both instruction and memory traces, the instruction traces each including a basic block identifier (BB_ID) of a basic block (BB) of original binary code of the instrumented binary code;
analyzing the respective BB_IDs of the instruction traces to determine whether one or more intermediate BBs of the binary code were executed by the GPU but not instrumented due to being control-flow changing BBs;
identifying the one or more intermediate BBs; and
outputting a program execution sequence for the original binary code.

23. The method of claim 22, wherein identifying the one or more intermediate BBs further comprises:
identifying a starting BB and an ending BB of the dynamic trace data;
recursively identifying, by referring to a control flow graph for the binary code, each child BB of the starting BB and each child BB of any identified child BB between the starting BB and the ending BB;
deleting any child BB that has no possible flow path to the ending BB;
continuing until the ending BB is reached; and
outputting a path from the starting BB to the ending BB.

24. The method of claim 23, further comprising terminating the identifying if the ending BB is not reached.

25. The method of claim 22, wherein identifying the one or more intermediate BBs further comprises:
identifying a BB that is repeated in adjacent instruction traces in the dynamic trace data;
iterating over every child BB of the repeated BB to:
find a control-flow changing child BB; and
determine if the control-flow changing child has a negative index;
inserting the child BB with a negative index after the repeated BB in the path to the ending BB; and
outputting a path from the starting BB to the ending BB.

* * * * *